US012713456B2

(12) United States Patent
Awadin et al.

(10) Patent No.: US 12,713,456 B2
(45) Date of Patent: Aug. 18, 2026

(54) FRAME BASED EQUIPMENT AND LOAD BASED EQUIPMENT MODES SWITCHING IN UNREGULATED NEW RADIO

(71) Applicant: InterDigital Patent Holdings, Inc., Wilmington, DE (US)

(72) Inventors: Mohamed Awadin, Plymouth Meeting, PA (US); Qing Li, Princeton Junction, NJ (US); Lakshmi R. Iyer, King of Prussia, PA (US); Yifan Li, Conshohocken, PA (US); Allan Y. Tsai, Boonton, NJ (US); Pascal M. Adjakple, Great Neck, NY (US); Patrick Svedman, Stockholm (SE); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 461 days.

(21) Appl. No.: 17/765,890

(22) PCT Filed: Oct. 2, 2020

(86) PCT No.: PCT/US2020/053969
§ 371 (c)(1),
(2) Date: Apr. 1, 2022

(87) PCT Pub. No.: WO2021/067719
PCT Pub. Date: Apr. 8, 2021

(65) Prior Publication Data

US 2022/0377790 A1 Nov. 24, 2022

Related U.S. Application Data

(60) Provisional application No. 62/910,677, filed on Oct. 4, 2019.

(51) Int. Cl.
*H04W 74/08* (2024.01)
*H04W 74/00* (2009.01)

(52) U.S. Cl.
CPC ......... *H04W 74/08* (2013.01); *H04W 74/006* (2013.01)

(58) Field of Classification Search
CPC ............................ H04W 74/08; H04W 74/006
See application file for complete search history.

(56) References Cited

U.S. PATENT DOCUMENTS 10,791,569 B2 * 9/2020 Salem .................. H04W 16/14
10,917,905 B2 * 2/2021 Zhang .............. H04W 74/0816
(Continued)

FOREIGN PATENT DOCUMENTS

CN 103650626 A 3/2014
CN 104717686 A 6/2015
(Continued)

OTHER PUBLICATIONS

3rd Generation Partnership Project; "Technical Specification Group Radio Access Network; Evolved Universal Terrestrial Radio Access (E-UTRA); Physical layer procedures (Release 13)", 3GPP TS 36.213 V13.9.0, Mar. 2018, 395 pages.
(Continued)

*Primary Examiner* — Parth Patel
(74) *Attorney, Agent, or Firm* — Flaster Greenberg P.C.

(57) ABSTRACT

A wireless device, such as user equipment (UE) or other apparatus, like may use a transparent mode operation in which the device is not aware of the operation mode of abase station, such as a gNB or other transmission and receive point (TRP), via the use of configurations for Frame Based Equipment (FBE) and Load Based Equipment (LBE) operating modes. A base station may initiate a Channel Occupancy Time (COT) that is an FBE COT or an LBE COT, in
(Continued)

which the wireless device follows FBE or LBE procedures accordingly. A variety of criteria may be applied in determining whether to use FBE or LBE procedures, and to switch between them. A network may use indicate the intention to switch operation mode and may do so via implicit or explicit indications. Similarly, a wireless device may autonomously switch operation mode, and may indicate the selected mode to the network.

16 Claims, 23 Drawing Sheets

(56) References Cited

U.S. PATENT DOCUMENTS 10,932,294 B2* 2/2021 Um ........ H04W 16/14
11,451,432 B2* 9/2022 Yerramalli ........ H04W 74/0808
11,696,284 B2* 7/2023 Liu ........ H04L 1/1893 370/329
12,035,368 B2* 7/2024 Kusashima ........ H04W 74/0808
12,082,253 B2* 9/2024 Wang ........ H04W 74/002
2013/0016696 A1 1/2013 Adjakple et al.
2014/0341018 A1* 11/2014 Bhushan ........ H04W 74/0816 370/230
2016/0095059 A1 3/2016 Salvador et al.
2016/0218925 A1 7/2016 Mammen et al.
2016/0338104 A1* 11/2016 Yin ........ H04W 74/0816
2017/0230986 A1* 8/2017 Moon ........ H04W 74/08
2017/0347365 A1* 11/2017 Xu ........ H04W 24/10
2018/0020375 A1* 1/2018 Matsumoto ........ H04W 84/12
2018/0049221 A1* 2/2018 Park ........ H04W 72/56
2018/0115394 A1 4/2018 Harada et al.
2018/0115983 A1 4/2018 Harada et al.
2018/0176890 A1* 6/2018 Moon ........ H04W 72/04
2018/0192442 A1* 7/2018 Li ........ H04W 74/0808
2018/0220459 A1* 8/2018 Park ........ H04W 48/10
2018/0288805 A1* 10/2018 Bhorkar ........ H04W 74/0816
2019/0013898 A1* 1/2019 Lei ........ H04W 72/20
2019/0174539 A1* 6/2019 Siomina ........ H04W 72/1273
2019/0268883 A1* 8/2019 Zhang ........ H04L 5/0094
2019/0274054 A1* 9/2019 Salem ........ H04L 12/189
2019/0335456 A1* 10/2019 Yerramalli ........ H04W 74/0808
2019/0342045 A1* 11/2019 Radulescu ........ H04W 72/1215
2020/0037354 A1* 1/2020 Li ........ H04W 74/0808
2020/0275484 A1* 8/2020 Xu ........ H04W 72/1268
2020/0280391 A1* 9/2020 Zhang ........ H04L 1/0015
2020/0305191 A1* 9/2020 Moon ........ H04W 72/23
2020/0314887 A1* 10/2020 Vaidya ........ H04W 72/0446
2020/0314891 A1* 10/2020 Li ........ H04W 74/006
2020/0322987 A1* 10/2020 Fisher-Jeffes ........ H04W 74/006
2020/0351919 A1* 11/2020 Oh ........ H04W 74/006
2020/0396767 A1* 12/2020 Talarico ........ H04W 74/0808
2020/0404708 A1* 12/2020 Zhang ........ H04W 16/14
2021/0014891 A1* 1/2021 Talarico ........ H04W 72/1273
2021/0022179 A1* 1/2021 Sun ........ H04W 74/085
2021/0044985 A1* 2/2021 Kim ........ G06N 20/00
2021/0084683 A1* 3/2021 Li ........ H04W 74/0808
2021/0100030 A1* 4/2021 Myung ........ H04W 74/0833
2021/0282182 A1* 9/2021 Nogami ........ H04W 74/08
2021/0378012 A1* 12/2021 Kusashima ........ H04W 74/0808
2021/0385831 A1* 12/2021 Nogami ........ H04W 72/23
2021/0385863 A1* 12/2021 Fan ........ H04W 74/008
2022/0070922 A1* 3/2022 Talarico ........ H04W 74/0808
2022/0110152 A1* 4/2022 Lim ........ H04W 74/006
2022/0116995 A1* 4/2022 Lu ........ H04W 72/04
2022/0159723 A1* 5/2022 Jiang ........ H04W 74/0866
2022/0256577 A1* 8/2022 Oh ........ H04W 74/0808
2022/0256598 A1* 8/2022 Kusashima ........ H04W 74/002
2022/0256601 A1* 8/2022 Harada ........ H04W 72/0446
2022/0346147 A1* 10/2022 Wang ........ H04W 74/0866
2022/0377790 A1* 11/2022 Awadin ........ H04W 74/006
2023/0035989 A1* 2/2023 Awadin ........ H04W 72/569
2024/0244658 A1* 7/2024 Guo ........ H04L 1/1854

FOREIGN PATENT DOCUMENTS

CN 107079460 A 8/2017
CN 107210933 A 9/2017
CN 109982432 A * 7/2019
CN 110100466 A 8/2019
KR 20170007762 A * 1/2017
WO 2016/165656 A1 10/2016
WO 2016163506 A1 10/2016
WO WO 2016/165654 A1 10/2016
WO WO 2020/125121 A1 6/2020

OTHER PUBLICATIONS

3rd Generation Partnership Project; "Technical Specification Group Radio Access Network; Evolved Universal Terrestrial Radio Access (E-UTRA); Physical layer procedures (Release 14)", 3GPP TS 36.213 V14.6.0, Mar. 2018, 466 pages.
3rd Generation Partnership Project; "Technical Specification Group Radio Access Network; Evolved Universal Terrestrial Radio Access (E-UTRA); Physical layer procedures (Release 15)", 3GPP TS 36.213 V15.1.0, Mar. 2018, 499 pages.
3rd Generation Partnership Project; "Technical Specification Group Radio Access Network; Study on NR-based access to unlicensed spectrum (Release 16)", 3GPP TR 38.889 V16.0.0, Dec. 2018, 119 pages.
3rd Generation Partnership Project; "Technical Specification Group Radio Access Network; NR; Physical channels and modulation (Release 15)", 3GPP TS 38.211 V15.1.0, Mar. 2018, 90 pages.
ETSI EN 301 893, 5 GHz RLAN; harmonised standard covering the essential requirement of article 3.2 of Directive 2014/53/EU, V2.1.1, May 2017.
Deng, et al., "Research and Simulation of LAA Channel Detection Mechanism Real", Mobile Communications, 22, Nov. 30, 2015, 24 pages.
R3-093238, "Introduction of Dual Cell E-DCH mode of operation", R3-093238, Ericsson 3GPP TSG-RAN3 Meeting #66 Jeju Island, South Korea, Nov. 2009, 638 pages.

* cited by examiner

FRAME BASED EQUIPMENT AND LOAD BASED EQUIPMENT MODES SWITCHING IN UNREGULATED NEW RADIO

CROSS-REFERENCE TO RELATED APPLICATIONS

This application is the National Stage Application of International Patent Application No. PCT/US2020/053969, filed Oct. 2, 2020 which claims the benefit of U.S. Provisional Patent Application No. 62/910,677, filed Oct. 4, 2019, entitled "Frame Based Equipment and Load Based Equipment Modes Switching in Unregulated New Radio", the contents of which are hereby incorporated by reference herein.

BACKGROUND

Machine-To-Machine (M2M), Internet-of-Things (IoT), and Web-of-Things (WoT) network deployments may comprise vehicle communications (V2X) as described in, for example: 3GPP TS 36.213, Physical layer procedures for control (Release 13), V13.9; 3GPP TS 36.213, Physical layer procedures for control (Release 14), V14.6; 3GPP TS 36.213, Physical layer procedures for control (Release 15), V15.1.0; 3GPP TR 38.889, Study on NR-based access to unlicensed spectrum (Release 15), V16.00; ETSI EN 301 893, 5 GHz RLAN; Harmonised Standard Covering the Essential Requirement of Article 3.2 of Directive 2014/53/EU, V2.1.1, May 2017; and 3GPP TS 38.211, Physical layer procedures for control (Release 15), V15.1.0

SUMMARY

A wireless device, such as user equipment (UE) or other apparatus, may use a transparent mode of operation in which the device is not aware of the operation mode of a base station, such as a gNB or other transmission and receive point (TRP), via the use of configurations for Frame Based Equipment (FBE) and Load Based Equipment (LBE) operating modes. A base station may initiate a Channel Occupancy Time (COT) that is an FBE COT or an LBE COT, in which the wireless device follows FBE or LBE procedures accordingly. A variety of criteria may be applied in determining whether to use FBE or LBE procedures, and whether to switch between them.

A network may indicate the intention to switch operation mode and may do so via implicit or explicit indications. Similarly, a wireless device may autonomously switch operation mode, and may indicate the selected mode to the network.

This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Many of the abbreviations used herein are described in Table 0 of the Appendix. As used herein, the term "procedure" generally refers to methods of performing operations to achieve particular ends. The term "procedure" is often used in place of "method" to avoid confusion with special meanings of the term "method" in the context of M2M and IoT applications. The steps described for procedures are often optional, and potentially be performed in a variety of ways and a variety of sequences. Hence, herein the term "procedure" should not be interpreted as referring to a rigid set and sequence of steps, but rather to a general methodology for achieving results that may be adapted in a variety of ways.

Unlicensed Spectrum in LTE

As specified in 3GPP TS 36.213, Physical layer procedures for control Release 13, V13.9, and Release 14, V14.6, Licensed-assisted access (LAA) targets the carrier aggregation (CA) operation in which one or more low power secondary cells (SCells) operate in unlicensed spectrum in sub 6 GHz.

In Release 14, several channel access procedures are introduced to be performed by eNB and UE for both downlink (DL) and UL transmissions, respectively. The main channel access procedure is described in Section 15 of TS 36.213 Release 14. See also 3GPP TS 36.213, Release 15, V15.1.0

Unlicensed Spectrum in NR

In mmWave, there is wide range of unlicensed spectrum that can be further utilized to attain higher data rate than attained by operating in sub 6 GHz frequency band. 3GPP TR 38.889, Study on NR-based access to unlicensed spectrum (Release 15), V16.00, discusses how physical channels and procedures in NR-U may have to be modified or introduced n to cope with NR-U challenges, and take into features of operating in mmWave such as deploying narrow beams for transmission and reception above 6 GHZ, up to 52.6 GHz, or even above 52.6 GHz bands. Procedures to enhance the co-existence between NR-U and other technologies operating in the unlicensed, e.g., WiFi devices, LTE-based LAA devices, other NR-U devices, etc., and meet the regulatory requirements were studied.

Frame Based Equipment (FBE)

Frame Based Equipment (FBE) is equipment where the transmit/receive structure has a periodic timing with a periodicity equal to a Fixed Frame Period (FFP). An "initiating" device is a device that initiates a sequence of one or more transmissions. Otherwise, a device is called a "responding device."

Figure 1:
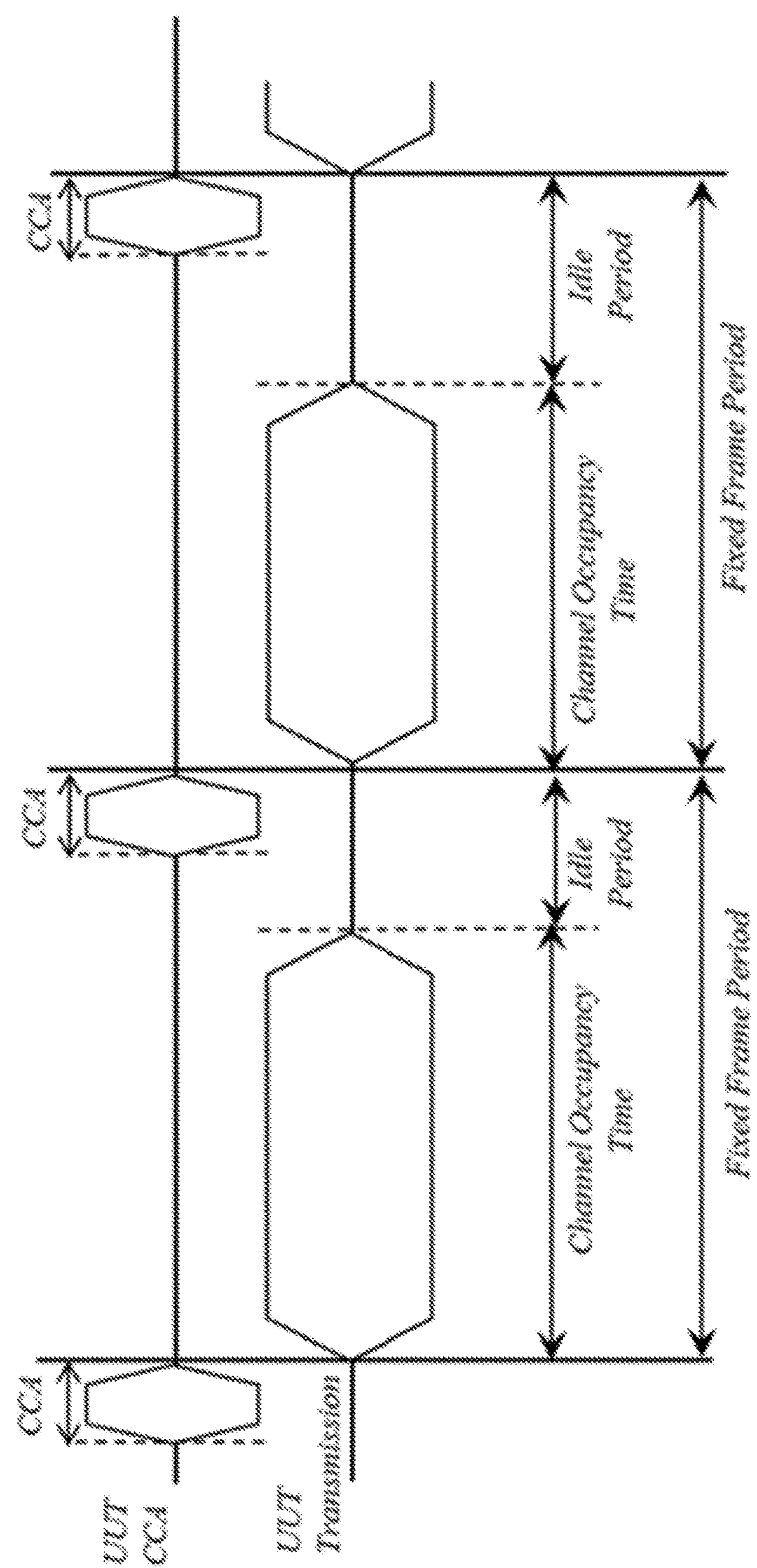
FIG. 1 is a timing diagram of example FBE timing.

An initiating device may implement a channel access mechanism as using a fixed frame period, e.g., 1 ms to 10 ms, where a transmission can only start at the beginning fixed frame period, as illustrated in the example of FIG. 1. See ETSI EN 301 893, 5 GHz RLAN; Harmonised Standard Covering the Essential Requirement of Article 3.2 of Directive 2014/53/EU, V2.1.1, May 2017. For example, an initiating device cannot change the fixed frame period more than, e.g., once every 200 mS. The initiating device may perform a Clear Channel Assessment (CCA) check during a single Observation Slot. If the Initiating Device finds the Operating Channel(s) to be clear, it may transmit immediately. An observation slot may be used, which is a period during which the operating channel is checked for the presence of other radio local area network (RLAN) transmissions and it shall have duration greater than, e.g., 9 µS.

If the Operating Channel is occupied, then there shall be no transmissions on that channel during the next Fixed Frame Period. An initiating device can have multiple transmissions within a Channel Occupancy Time without performing an additional CCA on this channel providing the gap between such transmissions does not exceed 16 µs. If the gap >16 µs, the initiating device may continue transmissions provided that an additional CCA detects no transmissions. All gaps are counted as part of the Channel Occupancy Time.

The Channel Occupancy Time (COT) shall not be greater than 95% of the Fixed Frame Period and shall be followed by an Idle Period until the start of the next Fixed Frame Period such that the Idle Period is at least 5% of the Channel Occupancy Time, with a minimum of 100 µs.

An Initiating Device is allowed to grant an authorization to one or more associated Responding Devices to transmit on the current Operating Channel within the current Channel Occupancy Time.

If the gap between the Responding Device transmission and the last transmission by the Initiating Device that issued the grant is less than 16 µs, the responding device transmit without performing a Clear Channel Assessment (CCA)

If the gap between the Responding Device transmission and the last transmission by the Initiating Device that issued the grant is greater than 16 µs, then the responding device has to perform CCA on the Operating Channel during a single observation slot within a 25 µs period ending, e.g., CAT2 Listen Before Talk (LBT), immediately before the granted transmission time The Responding Device may perform transmissions on the current Operating Channel for the remaining Channel Occupancy Time of the current Fixed Frame Period.

Load Based Equipment (LBE)

Load based equipment shall implement a Listen Before Talk (LBT) based channel mechanism to detect whether channel is idle or not. LBE is more aggressive than FBE because it can attempt to access the channel whenever there is intended transmission without being restricted to certain periodic frame structure as in FBE. See ETSI EN 301 893, 5 GHz RLAN; Harmonised Standard Covering the Essential Requirement of Article 3.2 of Directive 2014/53/EU, V2.1.1, May 2017.

Example Challenge: Identification of FBE or LBE and FBE-LBE Switching

Operating in FBE mode may outperform operating in LBE in some situation and vice versa in other situations. For example, in light to medium traffic load, operating in FBE may be advantageous since the channel access overhead is reduced. On the other hand, in high traffic load, operating in LBE may be advantageous since better channel utilization can be achieved. Consequently, we need to define the criteria for a gNB/TRP/UE to select/switch between FBE-LBE mode. We also need to develop the procedures that gNB/TRP/UE may use them to switch between FBE-LBE mode. To facilitate using both modes, there is a need for procedures to indicate the selected operation mode.

Transparent Operation

In transparent operation mode, a UE does not need be aware of the LBE/FBE operation mode of the gNB/TRP. The gNB/TRP can switch between FBE and LBE modes, or switch between different FBE configurations, without the need to transmit a "switch indication" to the UE. A switch indication is an indication from the network directing the UE to switch to a specific mode of operation, such as the LBE or FBE. Transparent operation mode allows the gNB/TRP to serve UEs regardless of whether the UEs operate as FBE or LBE. Therefore, a network can multiplex LBE and FBE UEs without significant cost of configuring or indicating the mode of operation.

A UE may autonomously select the operation mode based on some criteria such as its own capability, use cases and so on. (Alternatively, in a non-transparent operation mode a gNB/TRP may indicate the operation mode that a UE should use, and associated configurations to use, at certain stage in time.) In transparent mode, a gNB/TRP may switch between different operation modes/configurations without the need to transmit a switch indication.

Regardless of the FBE or LBE operation mode selected by a gNB/TRP, the gNB/TRP may groupcast/broadcast all the configurations necessary to support UEs operating as FBE or LBE, without indicating the selected operation mode by gNB/TRP.

For example, different channel access indications (CAI) may be used for different operation modes. The channel access indication for FBE ($CAI_{FBE}$) may differ from the channel access indication for LBE ($CAI_{LBE}$). For example, the former may be a preamble while the latter may be Group Common Physical Downlink Control Channel (GC-PDCCH). Also, $CAI_{FBE}$ and $CAI_{LBE}$ may carry different information. For example, $CAI_{LBE}$ may carry information about the COT duration, while $CAI_{FBE}$ may only indicate that the channel is occupied without the need to indicate the COT for the FBE case.

These configurations may also include information about FBE operation such as FFP, FBE COT, and/or idle window. The information be broadcasted/groupcasted to UEs operating as FBE and/or LBE. However, in transparent operation mode, no indication of which operating mode is selected by the gNB/TRP is sent.

If a UE operates in LBE mode, it may use the configurations related to LBE and ignore the configurations related to FBE mode, vice versa for FBE mode.

High layer messages, e.g., RRC IEs, may be used to indicate the configurations necessary for operating as FBE or LBE UE, e.g., FBE_configCommon and LBE_configCommon RRC IE, respectively.

If $CAI_{LBE}$ is transmitted through Downlink Control Information (DCI), then an LBE_configCommon IE may contain information about the search space of $CAI_{LBE}$ PDCCH provided by high layer parameters, e.g., a CAI-LBE-SearchSpaceId RRC parameter, which can be used to configure the search space ID used for $CAI_{LBE}$ PDCCH. Moreover, a CAI-LBE-ControlResourceSetId RRC parameter for example, may be used to overwrite the original Control Resource Set (CORESET) associated with CAI-LBE-SearchSpaceId because the $CAI_{LBE}$ CORESET may be differ than the original CORESET associated with CAI-LBE-SearchSpaceId. For example, $CAI_{LBE}$ CORESET may have smaller bandwidth to enhance power saving than original CORESET associated with CAI-LBE-SearchSpaceId. In case of the absent of CAI-LBE-ControlResourceSetId, then the original CORESET associated with CAI-LBE-SearchSpaceId is used. Monitoring $CAI_{LBE}$ can be beneficial for LBE UE as $CAI_{LBE}$ can indicate whether the LBE COT is acquired by the gNB/TRP. This allows an LBE UE to adjust its monitoring behavior of DL transmission leading to more power saving by avoiding monitoring DL transmissions while LBE COT is not acquired by gNB/TRP. Also, in wide band operation, $CAI_{LBE}$ can also indicate which subband (SB) within the active BWP is acquired by the gNB/TRP to allow LBE UE to adjust its receiver bandwidth to the actual acquired SBs by gNB/TRP.

On the other hand, FBE_configCommon may indicate the configurations to receive $CAI_{FBE}$. If $CAI_{FBE}$ is a preamble and/or sequence and/or reference signal and/or signal and/or channel, then their configurations may be part of FBE configCommon. For example, $CAI_{FBE}$ may be a wideband Demodulation Reference Signal (DMRS) associated with a particular CORESET and its ID may be indicated by high layer parameter, e.g., CAI-FBE-ControlResourceSetId RRC parameter.

Moreover, $CAI_{FBE}$ may be a Channel State Information Reference Signal (CSI-RS) and/or a Synchronization Signal Block (SSB). Then high layer parameters may indicate the IDs for CSI-RS and/or SSB. For example, RRC parameter csi-RS-CAI-FBE may be used to indicate the ID of an NZP-CSI-RS-Resource configured that may be periodic and its periodicity is aligned with the beginning of FFP. Also, RRC parameter SSB-CAI-FBE may be used to indicate the ID of an SSB that may be periodic, and its periodicity is aligned with the beginning of FFP.

Also, other FBE's parameters such as FFP and/or COT and/or idle window and so on may be indicated by high layer signaling such as RRC parameters FFP_duration, FFP_start/FFP_end, COT_duration, idle_window, for example. The RRC parameter FFP_duration may be used to indicate the duration of the deployed fixed frame period. The RRC parameter FFP_start/FFP_end may be used to indicate the start/end of one FFP and it may be in the granularity of slot and/or sub-frame and/or certain offset from particular SFN. For example, FFP_start/FFP_end may indicate the slot number and offset in units of Orthogonal Frequency Division Multiplexing (OFDM) symbols at which FFP starts/ends. With the knowledge of FFP duration and its start/end, UE(s) shall be aware of how FFP is mapped to NR radio frame. The RRC parameter COT_duration may be used to indicate the duration of the COT within each FFP which shall meet the regulation requirements, e.g., less than or equal 95% of FFP duration. It may be in granularity of OFDM symbols/slots and it may start immediately after the beginning each FFP. The RRC parameter Idle_window may be used to indicate the duration of the idle window which shall meet the regulation requirements, e.g., greater than or equal 5% of FFP duration. It may be in the granularity of OFDM symbols/slots and it may start immediately after the end of the COT. Also, high layer parameters such as the FFP_start and FFP_period, for example, may be used to indicate the beginning of the FFP and its periodicity.

The aforementioned parameters may be used to provide information about gNB's FFP or UE's FFP. Specifically, gNB and UE may have their own FFP configurations with some parameters being common for both of them. For example, gNB's FFP and UE's FFP may duration (period) of FFP which may be indicated by FFP_duration while there is time offset (time shift) between gNB's FFP and UE's FFP which can be indicated by FFP_start/FFP_end. The time offset (time shift) may be between the beginning of gNB's FFP and the beginning of UE's FFP, or between the beginning of UE's FFP and particular SFN, or between any reference point and particular point of UE's FFP.

When gNB/UE initiates DL/UL transmissions, gNB/UE may use their own FFP configurations. On the other word, if UE initiates UL transmission and intent to occupy the channel, then UE initiates COT based on UE's FFP configurations. Similar procedure may be applied by gNB when it initiates a COT.

FBE_configCommon may contain RRC parameter such as FBE-configID. This may be beneficial as gNB/TRP may indicate multiple FBE configurations where each one has its own FFP, COT duration, idle window and so on.

Upon the reception of FBE configurations and $CAI_{FBE}$ in any FFP, FBE UE may share the gNB/TRP acquired FBE COT for any initiated UL transmission such as Random Access Channel (RACH), SR, or configured grant. FBE UE may conduct no LBT or just CAT2 LBT if the gap between the last downlink/any other previous UL transmission and the intended new UL transmission is greater than certain threshold, e.g., 16 μS. In LBE operation mode, $CAI_{LBE}$ may allow COT sharing if the gap is less than certain threshold, e.g., 25 μS. If the gap is greater than this threshold, LBE UE needs to initiate a new COT.

Figure 2:
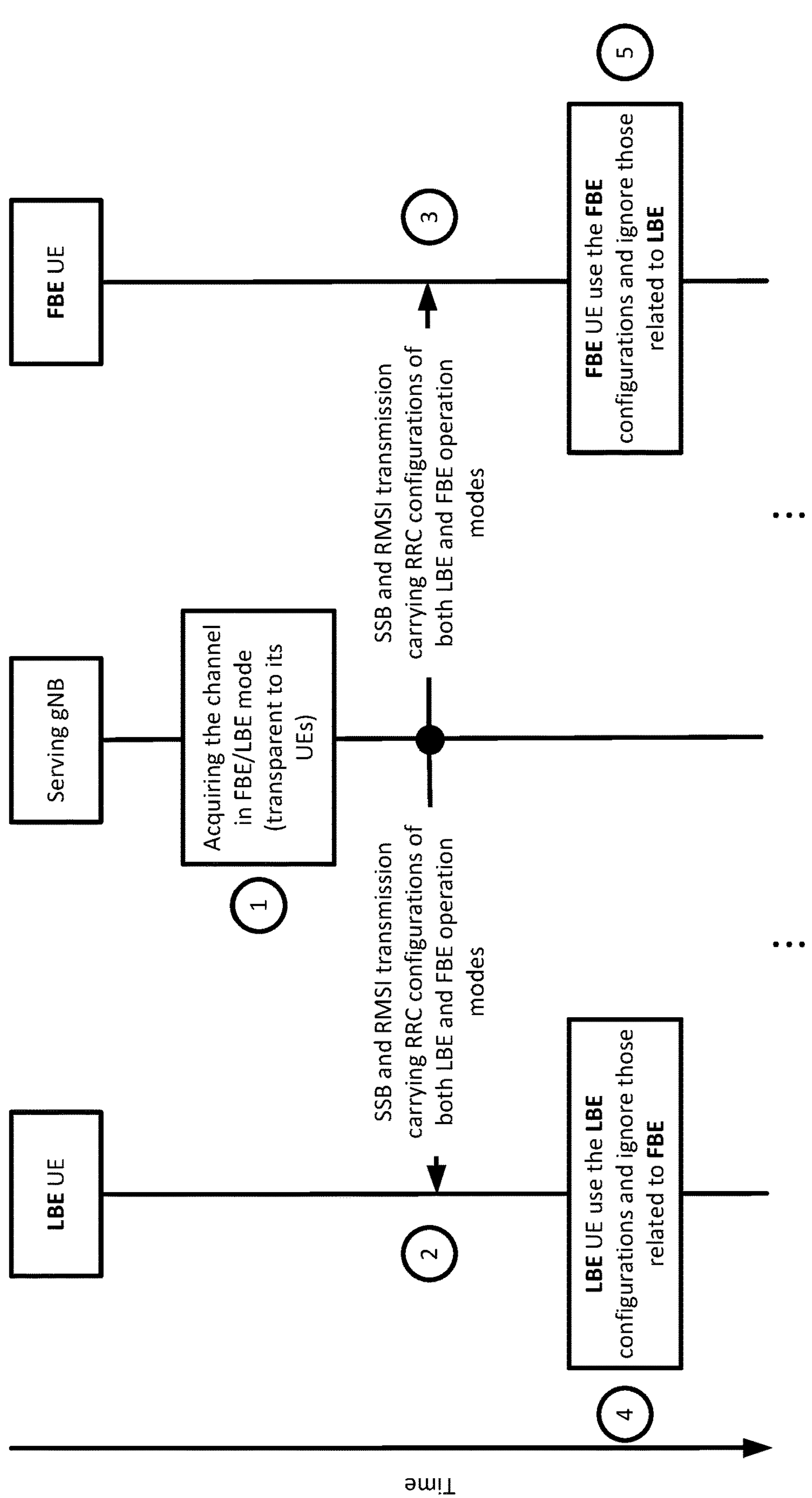
FIG. 2 is a call flow for example broadcast FBE and LBE configurations in RMSI.

The FBE and LBE configurations may be broadcasted by gNB/TRP as part of SSB and/or Remaining Minimum System Information (RMSI) and/or Other System Information (OSI). FIG. 2 shows an example of using RMSI to provide the FBE and LBE configurations, e.g., FBE_configCommon and LBE_configCommon. Specifically, gNB/TRP acquires channel either as FBE or LBE, which is transparent to UEs served by this gNB/TRP (step 1). Both FBE and LBE UEs receive the configurations of FBE and LBE operation modes (steps 2 and 3). Then LBE UE may use the configurations related to LBE operation mode and ignore those related to FBE operation mode (step 3). Similarly, FBE UE may use the configurations related to FBE operation mode and ignore those related to LBE operation mode (step 4).

Alternatively, FBE and LBE configurations, e.g., FBE_configCommon and LBE_configCommon, may be groupcasted and scheduled by GC-PDCCH. To this end, a new RNTI, FBE_LBE_RNTI, may be used to scramble the GC-PDCCH's CRC. Groupcasting FBE and LBE configurations may update the earlier provided configurations. The configurations necessary for decoding this GC-PDCCH may be indicated as part of FBE and/or LBE configurations, e.g., FBE_configCommon and/or LBE_configCommon. For example, GC-PDCCH RNTI, e.g., FBE_LBE_RNTI, and/or its associated search space ID and/or CORESET ID may be indicated in FBE_configCommon and/or LBE_configCommon through high layer parameters, e.g., FBE_LBE_RNTI, ConfigUpdating_SearchSpaceId and ConfigUpdating_CoresetID RRC parameters. If ConfigUpdating_CoresetID is not configured, then the CORESET associated with ConfigUpdating_SearchSpaceId is used.

These configurations, e.g., FBE_config and LBE_config RRC IE, may be signaled in a UE-specific manner. FBE_config and LBE_config may have all the parameters in FBE_configCommon and LBE_configCommon, respectively. A UE-specific PDCCH scrambled with C-RNTI for example, such as DCI-format 1_0 and/or 1_1, may be used to schedule FBE_config and LBE_config.

The aforementioned signaling may indicate the FFP configurations of gNB's FFP or UE's FFP. For example, RMSI may indicate the duration (period) of gNB's and UE's FFP using RRC parameters such as FFP duration gNB and FFP_duration_UE, or through dedicated RRC messages, one for gNB's FFP and other for UE's FFP such as FBE_configCommon_gNB and FBE_configCommon_UE. The RRC configurations of UE's FFP may be optional and when they are absent, UE may apply the same configurations of gNB's FFP. For example, if the duration or period of UE's FFP is not configured, then UE may assume that duration of UE's FFP is equal to the duration of gNB's FFP.

As another method to convey the configurations of UE's FFP and gNB's FFP may be as follows. The configurations of gNB's FFP may be broadcasted in RMSI for example. On the other hand, the configurations of UE's FFP may be transmitted in UE specific RRC messages. In this case, UE may assume that the broadcasted configurations are for gNB's FFP while the configurations that are transmitted in UE-specific RRC are for UE's FFP. The configurations of UE's FFP that are not transmitted in UE-specific RRC may be as same as the broadcasted configurations of gNB's FFP.

Some parameters such as time shift (time offset) between UE's FFP and gNB's FFP may be either transmitted as part of the configurations of gNB's FFP or UE's FFP. If it is absent, UE may assume that the time shift (time offset) is equal to zero.

An example of LBE_configCommon IE is illustrated in Code Example 1 of the Appendix.

An example of FBE_configCommon IE is illustrated in Code Example 2 of the Appendix.

gNB Initiates FBE COT

A gNB/TRP may operate in FBE mode with a certain fixed frame period (FFP) where each period is divided into two portions, or more, for transmission during channel occupancy time (COT), idle window with no transmission and possibly other windows for extra channel sensing to support different channel access priority for FBE operation mode such as second stage channel sensing, if needed.

UE Operates as LBE

LBE UE expects to receive all the signals/channels necessary for LBE operation mode based on the provided configurations, e.g., LBE_configCommon.

Figure 3:
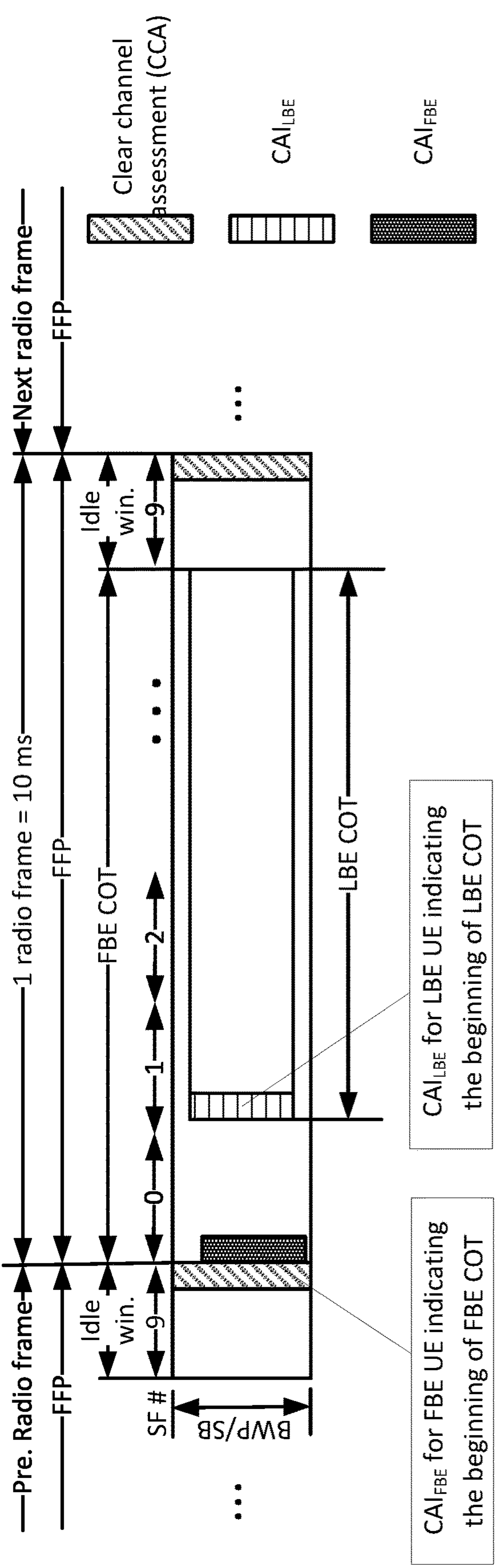
FIG. 3 is a timing diagram of an example in which CAIFB and CAILBE are transmitted to indicate the beginning of FBE/LBE COT.

FIG. 3 shows an example of $CAI_{FBE}$ transmitted at least at the beginning of FBE COT. FBE UEs are expected to receive this $CAI_{FBE}$ indicating the beginning of FBE COT, while LBE UEs are not expected to decode/detect $CAI_{FBE}$. Also, $CAI_{LBE}$ is transmitted and LBE UEs are expected to decode/detect it to identify the beginning LBE COT as illustrated in FIG. 3, for example, while FBE UEs are not expected to decode/detect $CAI_{LBE}$.

LBE-COT shall be a portion of FBE-COT in frequency and time domains. Specifically, in frequency domain, some sub-bands (SB) may be used for LBE UEs, as shown in FIG. 3 for example. In time domain, LBE COT may overlap with FBE COT, but LBE COT shall not start/end before/after FBE-COT, e.g., LBE COT shall not overlap with the idle window. In the overlapping portion between FBE COT and FBE LBE, both FBE and LBE UEs may use it.

LBE UE may share the gNB's acquired COT with just conducting simplified channel sensing such as CAT2 LBT, for example, even if the time gap between the last transmission and the intended UL transmission is greater than certain threshold, e.g., 25 μS. For example, this may occur if the LBE UE is aware that LBE COT is part of FBE COT.

For scheduled UL transmission, e.g., PUSCH, gNB/TRP may indicate the type of channel access procedures and the priority of UL transmission in the DCI providing the UL grant, e.g., DCI 0_0-like or DCI 0_1-like. A new field may be used to indicate channel access type consists of log2 (number of channel access procedure). For example, if only two channel access procedure types are supported, e.g., CAT2 LBT and CAT4 LBT, then 1-bit field is enough to indicate the channel access type. Also, another field may be used to indicate the channel access priority class consisting of log2(number of channel access priority classes). LBE UE shall apply the indicated channel access type with the indicated priority. If UE is provided the grant within the gNB acquired COT, the UE share the gNB's COT may performs only CAT2 sensing even when operating as LBE.

UE Operates as FBE

For a UE that operates as FBE, it may assume that the provided configurations of FBE operations mode is applied, which includes the configuration of $CAI_{FBE}$, FFP, COT duration, idle window and so on for either gNB's FFP or UE's FFP.

Moreover, the gNB/TRP may provide multiple FBE configurations for different FBE UEs depending on their capabilities, use cases and so on, e.g., different UEs may have different UE's FFP configurations which may be different than gNB's FFP. These configurations may be broadcasted/groupcasted/unicasted. UE capability may limit which configurations can be supported by the UE and the preferred configurations may be autonomously selected by the UE. Also, gNB/TRP may indicate which configurations an FBE UE may use, this is considered as non-transparent operation mode because gNB/TRP indicates the operation mode that should be used by the UE, procedure to enable this is described later. However, gNB/TRP may later change the configurations of without the need of transmitting an indication to the UE making the operation transparent again.

Figure 4A:
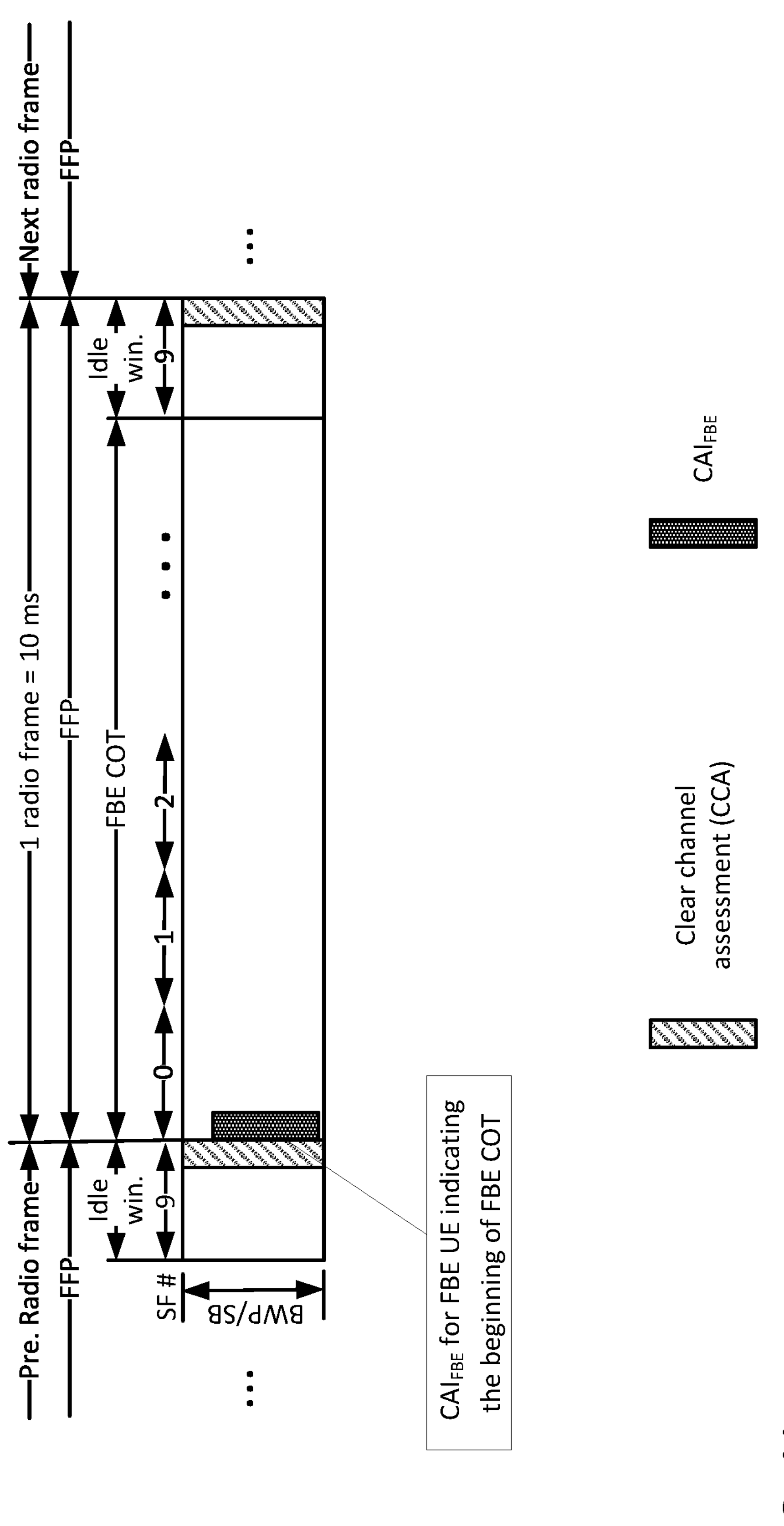
FIG. 4A is a timing diagram of an example FBE configuration for a UE, wherein FFP is assumed to equal radio frame period.
Figure 4B:
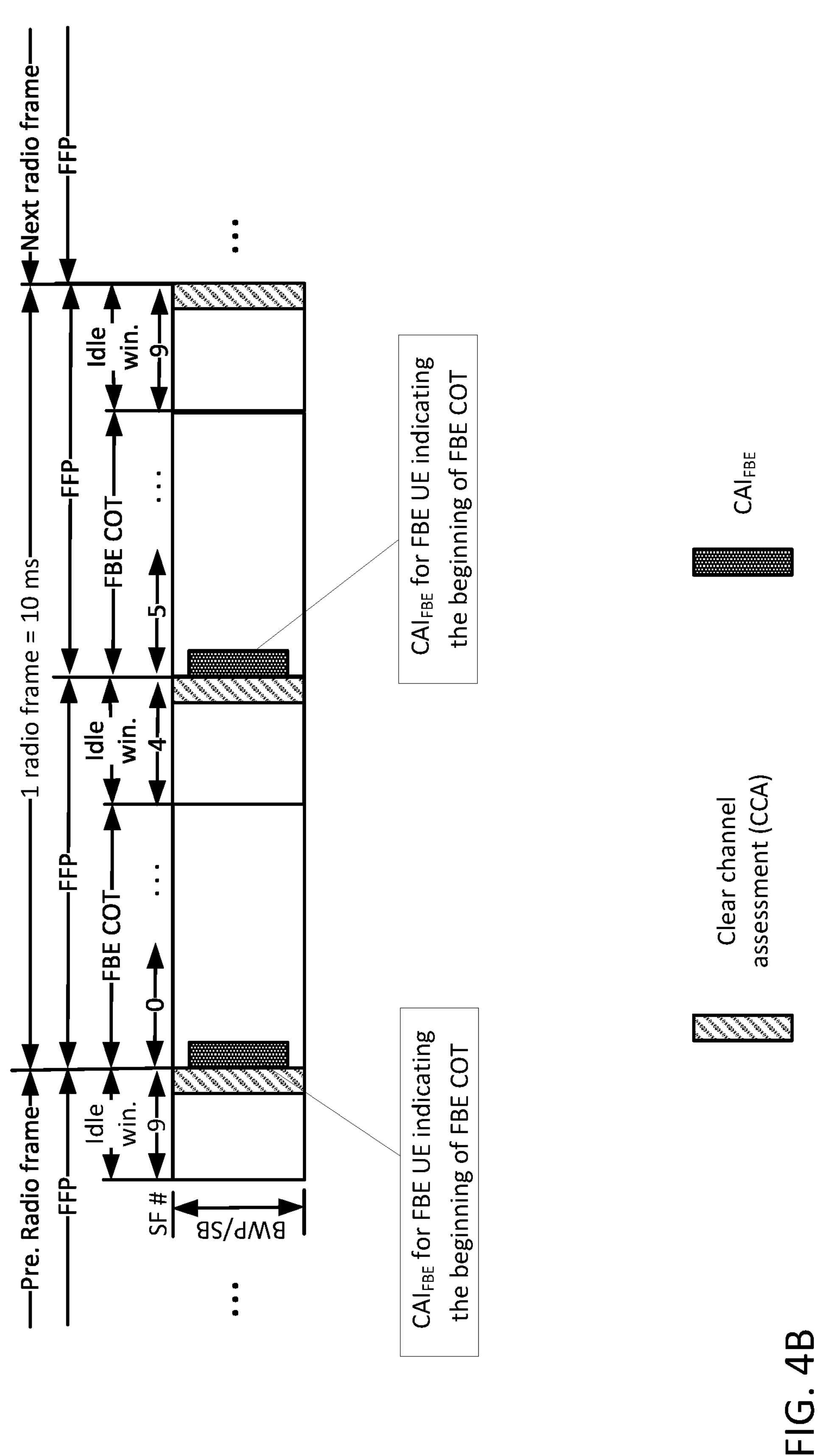
FIG. 4B is a timing diagram of an example FBE configuration for a UE, wherein FFP is assumed to equal a half frame period.

To this end, the beginning of some FFPs of FBE configurations of UEs should be aligned even if the FFP period is different. However, in general, there can be a time shift (time offset) between gNB's FFP and UE's FFP. FIG. 4 shows an example of two FBE configurations used by two different UEs, or one UE and its serving gNB. Those two UEs are not aware of which FBE configurations are used at the gNB/TRP. However, in general, UEs may be aware of gNB's FFP configurations which may be signaled using one of the aforementioned procedures. In FIG. 4A, FFP is assumed to be one radio frame, while in FIG. 4B FFP is assumed to be half radio frame.

If a gNB/TRP uses the FBE configurations in FIG. 4A, for example, then FBE UE2 using FBE configurations in FIG. 4B, for example, may assume that no DL/UL transmission may occur during its idle window, even if gNB/TRP successfully acquire FBE COT based on FBE configurations in FIG. 4A which contains its idle window. In other words, in this example, no DL/UL transmission the idle window of UE's, regardless who initiate the COT. Moreover, no UL/DL transmission may occur in the idle window of gNB's FFP.

Alternatively, no UL in idle window of UE's FFP, but gNB may transmit DL within UE's idle window if the COT is initiated by gNB according to the configurations of gNB's FFP. However, if gNB shares the UE's initiated COT in UE's FFP, then no DL may occur in the idle window of UE's FFP. Similarly, UE may transmit UL in the idle window of gNB's FFP when UE initiates a COT according to UE's FFP. However, UE may not transmit UL transmission in idle window of gNB's FFP when UE shares it with gNB.

If a gNB/TRP uses the FBE configurations in FIG. 4A, for example, and successfully acquire its FBE COT, then it may do cross COT scheduling for FBE UE2 whose COTs, in FIG. 4B for example, are fully are partially contained in the bigger COT acquired by the gNB/TRP, in FIG. 4A for example. In this case, FBE UE2 may skip monitoring $CAI_{FBE}$ before the beginning of the second COT, in FIG. 4B, because it is a portion of a bigger successfully acquired COT, in FIG. 4A, and just receive/transmit the DL/UL scheduled in the previous COT. In this scenario, the UE may determine that UL transmission occurs as UE shares the gNB's initiated COT not through a UE initiated COT according to UE's FFP. To the let the UE know whether UE needs to initiate its COT according to UE's FFP or share gNB initiated COT according to gNB's FFP. This can be realized by transmitting explicit indication to point that UL is within gNB's initiated COT according to gNB's FFP. Such indication may be transmitted as part of DCI that provides the UL grant, for example a field in the DCI may indicate UE will share gNB's COT or UE has to initiate its own COT. Alternatively, the DCI may indicate the type of LBT that the UE should conduct.

If a gNB/TRP uses the FBE configurations in FIG. 4B, for example, and successfully acquire its FBE COT which is smaller than FBE COT for FBE UE1 in FIG. 4A, this may cause ambiguity for FBE UE1. The reason is that if an FBE COT is successfully acquired by a gNB/TRP, then its FBE UEs may share it for UL transmission with at most CAT2 LBT or even no LBT at all. Here, this cannot occur because gNB/TRP may only claim an FBE COT in FIG. 4B not FBE COT in FIG. 4A.

Consequently, FBE COT sharing may be enabled and disabled. If the FBE configurations used by a UE is different than FBE configurations used by its serving gNB/TRP acquiring the channel, then COT sharing may be disabled.

If $CAI_{FBE}$ is GC-PDCCH or a UE-specific PDCCH, then a one-bit field may be used to indicate whether COT sharing is enabled or disabled. $CAI_{FBE}$ GC-PDCCH to be scrambled a new RNTI, CAI_FBE_RNTI for example, while the $CAI_{FBE}$ UE-specific PDCCH may be scrambled with C-RNTI.

If $CAI_{FBE}$ is DMRS, then DMRS sequence and/or pattern may be used to indicate whether COT sharing is enabled or disabled. For example, two DMRS sequences may be used to indicate that gNB/TRP acquired the channel successfully. One of them indicates that COT sharing is enabled while other indicates that COT sharing is disabled. A high layer parameter may be used to indicate which DMRS scrambling initialization is used to indicate whether COT sharing is enabled or disabled, such as COT-sharingEnabled-DMRS-scramblingID and COT-sharingDisabled-DMRS-scramblingID RRC parameters for example. The same approach may be applied for DMRS of $CAI_{FBE}$ if it is PDCCH.

Similarly, if $CAI_{FBE}$ is CSI-RS, then CSI-RS sequence and/or pattern may be used to indicate whether COT sharing is enabled or disabled. For example, two CSI-RS sequences may be used to indicate that gNB/TRP acquired the channel successfully. One of them indicates that COT sharing is enabled while other indicates that COT sharing is disabled. A high layer parameter may be used to indicate which CSI-RS scrambling initialization is used to indicate whether COT sharing is enabled or disabled, such as COT-sharingEnabled-CSI-RS-scramblingID and COT-sharingDisabled-CSI-RS-scramblingID RRC parameters for example.

Figure 5:
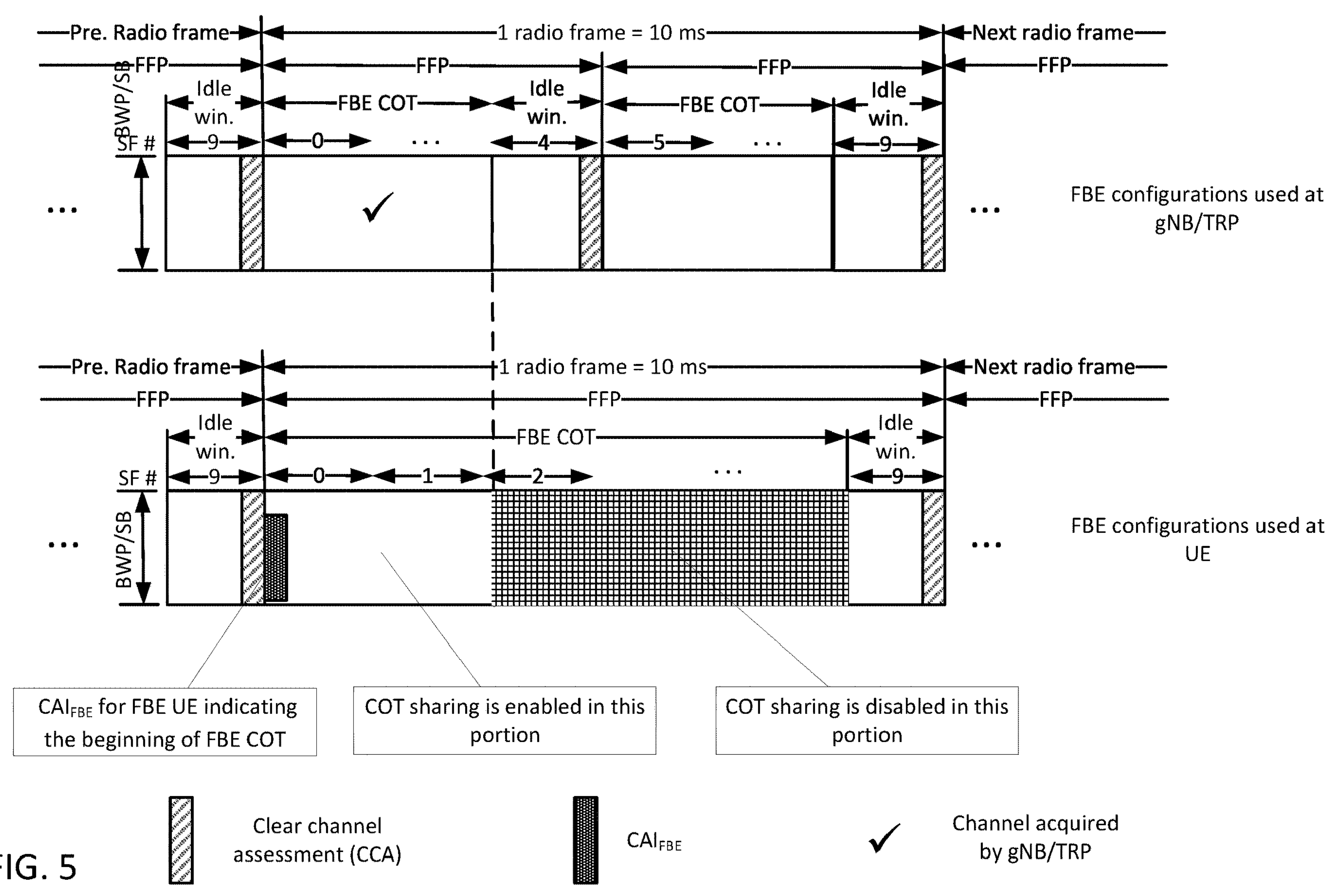
FIG. 5 is a timing diagram of an example COT sharing is enabled in the portion that overlaps with actual FBE COT acquired based on FBE configurations gNB/TRP not based on FBE configurations at UE

Instead of turning on/off the possibility of COT sharing, alternatively the gNB/TRP may indicate in which portion of the claimed COT an FBE UE may share the COT. FIG. 5 shows an example a gNB/TRP using FBE configurations in which FFP is set to half radio frame while an FBE UE operates with FFP is to one radio frame. Consequently, the FBE COT from gNB/TRP perceptive is smaller than FBE COT from UE perceptive. Please note that in transparent operation mode, FBE UE is not aware of the operation mode at gNB/TRP and its configurations. Consequently, the COT sharing is only allowed in the portion of UE's FBE COT that overlaps with gNB/TRP's FBE COT as shown in the example of FIG. 5. On the other hand, if the UE is aware of gNB's FFP configurations, then the UE may share gNB-initiated COT according to gNB's FFP configurations.

In some occasions, sharing the COT may not provide enough time for the intended DL/UL transmission. Therefore, gNB/UE may initiate their own COT rather than sharing the COT initiated by UE/gNB, respectively. For example, if a UE initiates a COT according to UE's FFP and if gNB share the UE initiated COT, then the gNB has to terminate the DL transmission according to the UE's FFP configurations. Therefore, the gNB may initiate its own COT according to its FFP configurations. Effectively, both the UE and the gNB occupy the channel, but each one occupies it according to the UE's and the gNB's FFP configuration, respectively.

High layer signaling may indicate in which portion FBE COT sharing is enabled. For example, RRC parameter such as COT-sharing may be used to indicate the last symbol/slot/sub-frame index of the portion that FBE COT sharing is allowed. Or, the high layer parameter, e.g., COT-sharing for example, indicate the length of this portion from the beginning of COT which may be units of symbols/slots/sub-frames.

$CAI_{FBE}$ may indicate the last symbol/slot/sub-frame index in the FBE COT before which COT sharing is enabled. Also, $CAI_{FBE}$ may be indicate the length of the portion in which COT sharing is allowed in units of symbols/slots/sub-frames.

If $CAI_{FBE}$ is GC-PDCCH or a UE-specific PDCCH, then a new field may indicate the index of last symbol/slot/sub-frame in the portion that COT sharing is allowed, or the duration of this portion. This new field may indicate particular value out of some configured values by high layer signaling. For example, high layer signaling may configure a table, such as Table 1 of the Appendix, with different duration/indices of last symbol/slot/sub-frame of the portion in which COT sharing is enabled. In this case, the new field of $CAI_{FBE}$ PDCCH consist of 3 bits as an example for indicating which configurations is used.

$CAI_{FBE}$ may be used to indicate the configured grant IDs that FBE UE may use in gNB/TRP initiated COT. For example, if $CAI_{FBE}$ is GC-PDCCH or UE-specific PDCCH, then it may have a bit map field that indicates which configured grant IDs may be used in gNB initiated COT. The size of the bit map may be equal to the number of configured grant IDs. The most significant bit may indicate the activation/deactivation of the configured grant with the highest ID, and the second most significant bit may indicate the activation/deactivation of the second highest configured grant ID. Alternatively, the $CAI_{FBE}$ may indicate the resources on which any configured grant may be transmitted—this may be in the form of the starting symbol/mini-slot/slot in the COT and optionally an offset from the start. If not offset is provided, the UE uses the FFP boundary to determine the end of the resources (prior to the configured IDLE period of the FFP).

$CAI_{FBE}$ to have a field indicating the index of single configured grant ID that may be used in the gNB/TRP initiated COT. The size of this field is equal to log2(number of configured grant IDs) and code point is mapped to single configured grant ID.

gNB Initiates LBE COT

A gNB/TRP may operate in LBE mode in which gNB/TRP can access the channel at any time if it senses the channel to be clear using the applicable Listen Before Talk (LBT) procedure. The channel can be occupied for variable duration depending on the intended transmission and the conducted LBT procedure.

UE Operates as LBE

No special considerations are needed and regular LBE procedures may be applied because both gNB/TRP and UE operate as LBE.

UE Operates as FBE

FBE UE expects to receive all the signals/channels necessary for FBE operation mode based on the provided configurations, e.g., FBE_configCommon.

Figure 6:
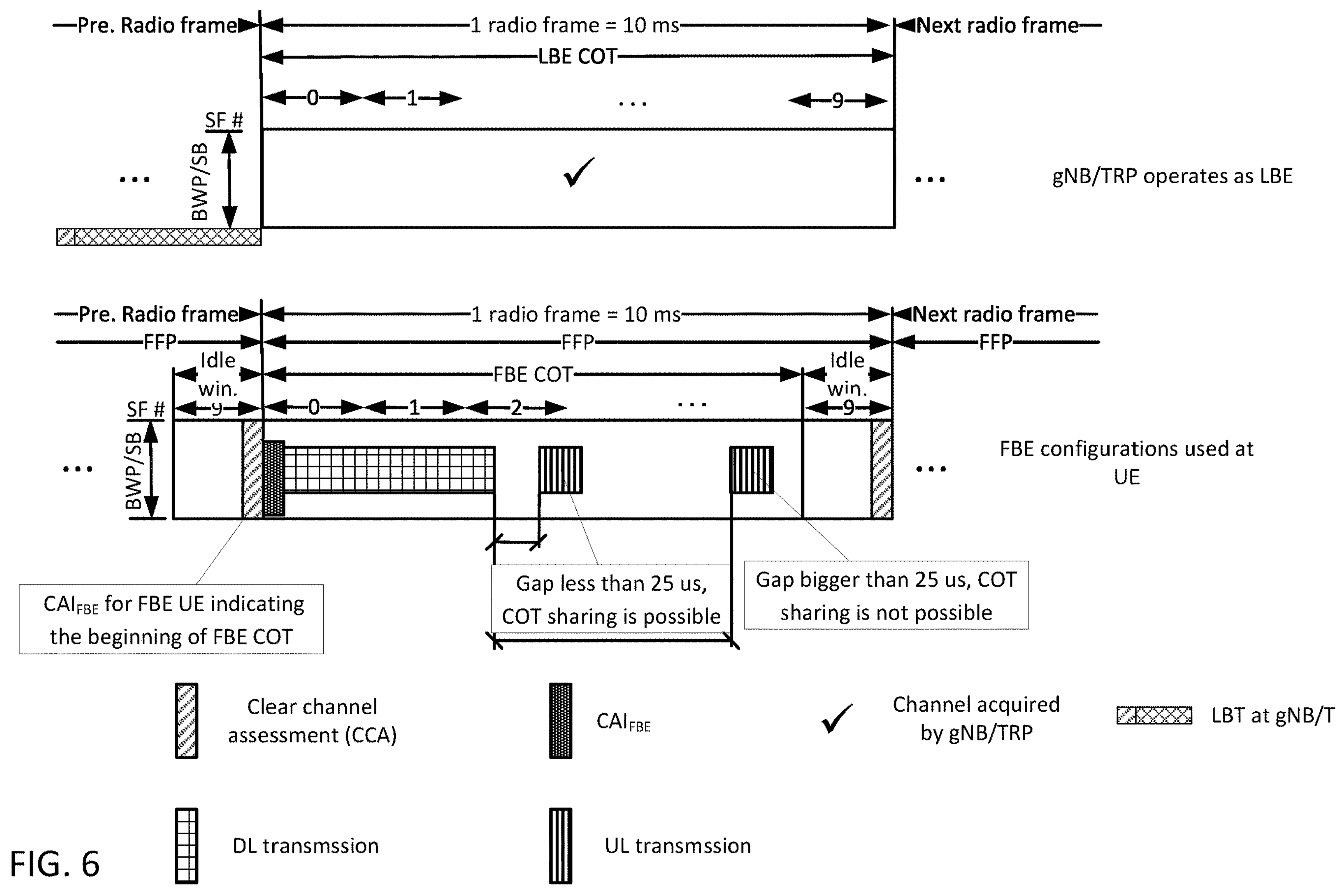
FIG. 6 is a timing diagram of an example wherein a gNB/TRP operates as LBE while UE operates as FBE and COT sharing is only allowed when the gap between DL (downlink) and intended UL (uplink) is less than 25 μS

Since LBE is more flexible and channel may be acquired at any time after successful LBT, one possibility is that gNB/TRP attempts to access the channel before or at the beginning of FFP of FBE UE, as shown in FIG. 6 for example. Also, LBE COT may be equal to FFP of the FBE UE. In this case, gNB/TRP may transmit $CAI_{FBE}$ based on the provided FBE configurations.

In transparent operation mode, FBE UE is not aware of the operation mode at gNB/TRP. Consequently, FBE UE may assume that COT sharing is allowed with no LBT or just CAT2 LBT regardless the time gap between the last DL transmission and intended UL transmission as long as both DL and UL are falling in the same COT. However, this may not be applicable because gNB/TRP acquires the channel as LBE and sharing the DL COT for UL transmission with CAT2 LBT is only allowed if the time gap between the last DL transmission and the intended UL transmission is smaller than certain threshold, e.g., 25 μs for FR1.

Therefore, FBE UE may not assume COT sharing is always enabled. If both gNB/TRP and its associated UE operate as FBE, then gNB/TRP may schedule UL transmission without the need to indicate LBT type for UL transmission. Here, FBE UE may share the DL COT only if it received an indication enabling COT sharing. To this end, DCI providing UL grant may indicate the LBT type before the UL transmission. For example, a new field in the DCI may be used to indicate the type of LBT.

For example, FIG. 6 shows an example, that a UE may share the gNB/TRP's COT for UL transmission when the gap between the last downlink and intended UL is less than 25 μS. However, if there other intended UL transmission as shown FIG. 6, e.g., configured grant, that falls within gNB/TRP COT, but the gap between the last downlink and this intended UL is greater than 25 μS, then FBE UE may not transmit this UL. Please note, if gNB/TRP were operating as FBE, then it would be possible for FBE UE to perform the other UL transmission in FIG. 6.

FBE UE may not expect to receive an indication that CAT4 LBT is required for UL transmission because in FBE operation no CAT4 LBT is supported.

Also, procedures to indicate whether COT sharing is enabled/disabled if gNB/TRP operates as LBE while UE operates as FBE may be used when both gNB/TRP and UE operates as FBE with different configurations.

Figure 7:
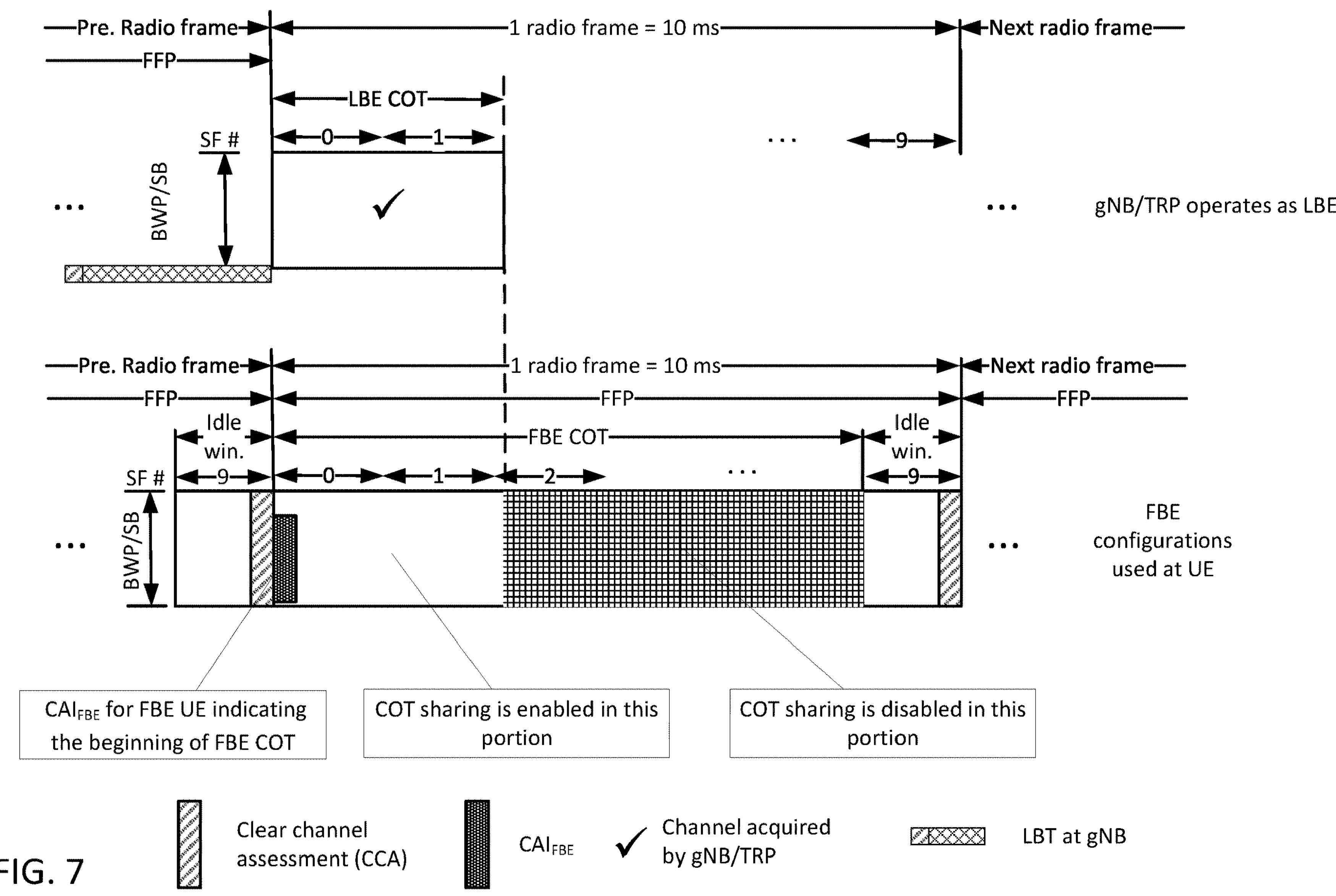
FIG. 7 is a timing diagram of an example wherein an LBE COT is shorter than FBE COT.

Since the duration of LBE COT is variable depending on the conducted LBT type, LBE COT may be much smaller than FBE COT as shown in FIG. 7, for example. If both gNB/TRP and UE operate as FBE, there is no need for $CAI_{FBE}$ to indicate the COT duration because it should be known once the channel is acquired by gNB/TRP and it is part of FBE configurations. Therefore, $CAI_{FBE}$ may carry information about the COT duration acquired by LBE gNB/TRP.

If LBE COT is shorter than FBE COT, no UL transmission may occur after the end of the LBE COT, as shown in FIG. 7 for example. The reason is that any UL transmission after the end of LBE COT should be treated as UE initiated transmission, but FBE UE is not allowed to initiate a COT other than at the beginning of FFP.

FBE-LBE Switching Procedures

Various criteria may be used by a gNB/TRP or UE in deciding whether to use and FBE or LBE operation mode or to switch between different FBE configurations, for example UE/gNB may switch between one FFP configurations to another with different configurations such as different FFP periodicity (duration).

Counter/Timer-Based Switching

If gNB/TRP or UE operates as FBE and unsuccessfully attempts to access the channel for extended period of time or after so many channel access attempts, gNB/TRP or UE may switch from FBE mode to LBE mode or switch from one FFP configuration to another.

Figure 8:
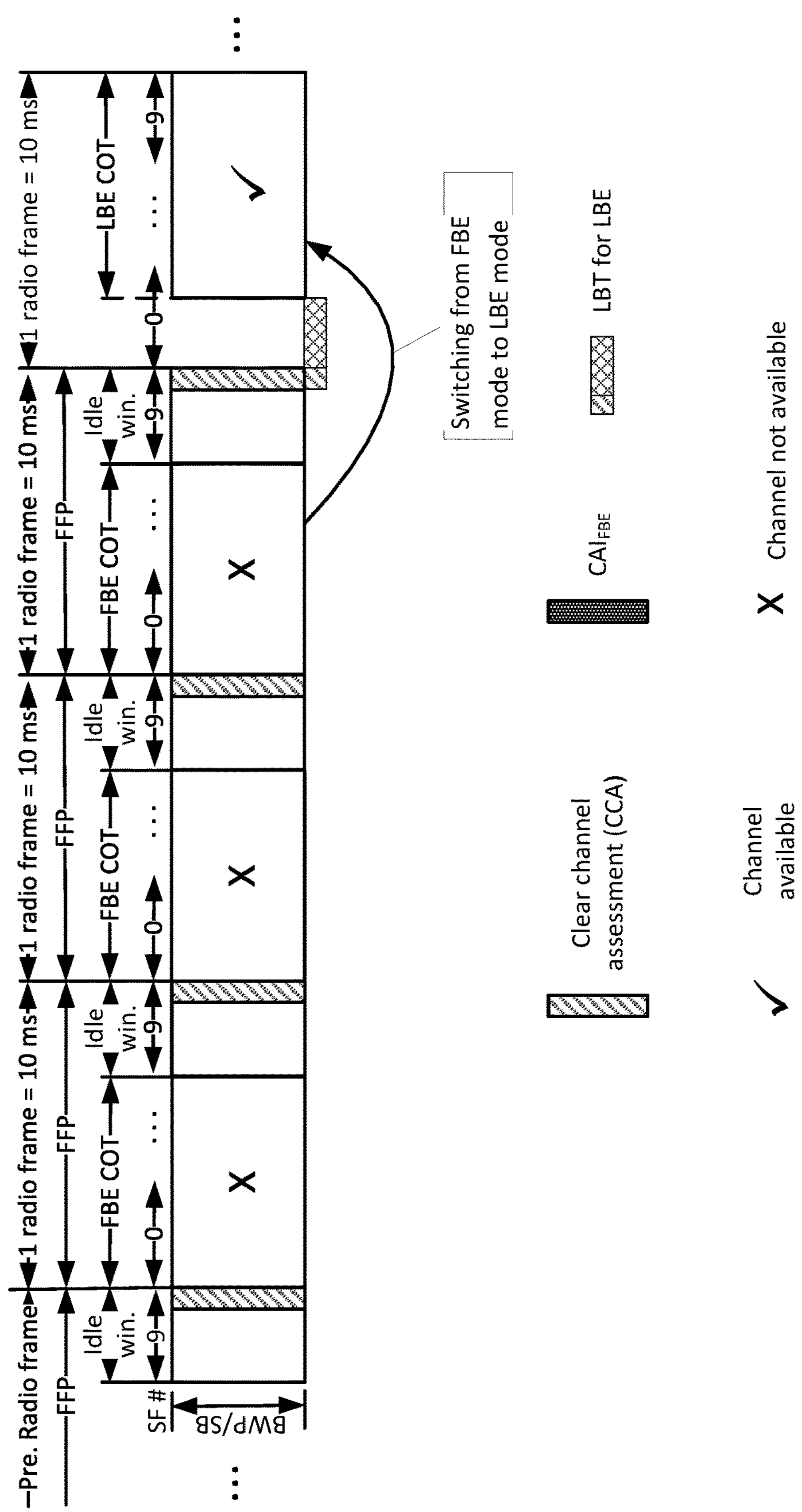
FIG. 8 is a timing diagram of an example wherein a switching from FBE mode to LBE after three unsuccessful channel attempts.

FIG. 8 shows an example of a gNB/TRP or a UE unsuccessfully attempting to access the channel as FBE in 3 consecutive FFPs. It switches from FBE to LBE and conducts LBT based on the intended transmission.

The number of consecutive unsuccessful channel access attempts after which FBE, such as gNB/TRP or UE, may switch to LBE, or switching from one FFP configuration to another may be predefined, e.g., specified per the standard.

For an FBE UE initiated COT, the number of consecutive unsuccessful channel access attempts after which this FBE UE may switch to LBE mode or switch from one FFP configuration to another may be signaled through high layer signaling, number-of-FBE-failed-attempts RRC parameter.

The number of consecutive unsuccessful channel access attempts after which FBE such as gNB/TRP or UE may switch to LBE or switch from one FFP configuration to another may depend on intended transmission. For example, this number may depend on the channel access priority class. This number may be predefined for each channel access priority class, as shown in Table 2, for example.

Table 2 shows example numbers of consecutive unsuccessful channel access attempts after which gNB/TRP or UE may switch to LBE or switch from one FFP configuration to another.

For an FBE UE initiated COT, the number of consecutive unsuccessful channel access attempts after which this FBE UE may switch to LBE mode or switch from one FFP configuration to another may be signaled through high layer signaling for different channel access priority classes. For example, if there are four channel access priority classes, then number-of-FBE-failed-attempts may be set to $\{N_1, N_2, N_3, N_4\}$ where $N_i$ is the number of consecutive unsuccessful channel access attempts after which this FBE UE may switch to LBE mode or switch from one FFP configuration to another for the $i^{th}$ channel access priority class.

Figure 9:
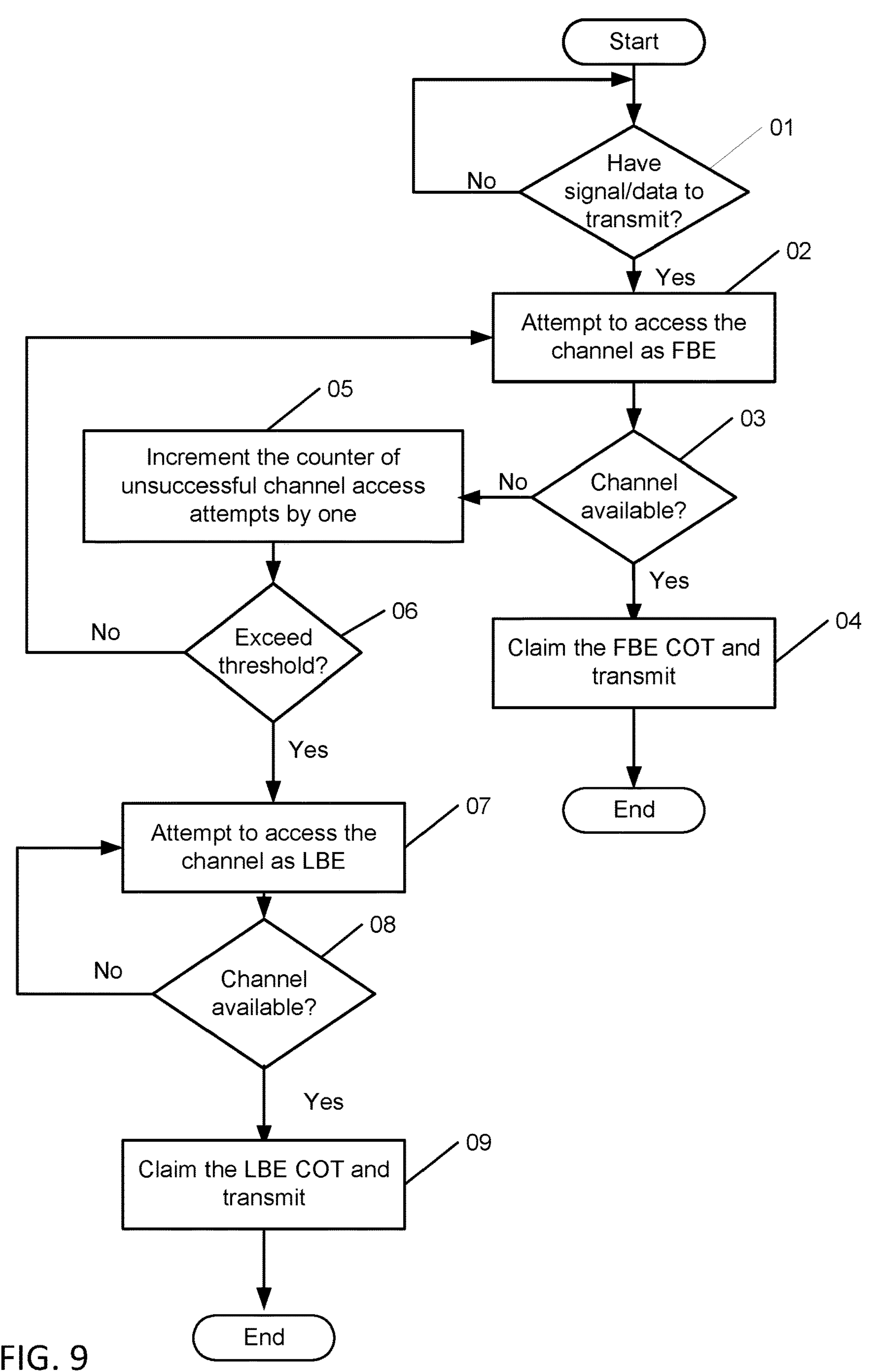
FIG. 9 is a flowchart illustrating an example of counter-based switching from FBE to LBE.

Also, instead of indicating the number of consecutive unsuccessful channel access attempts after which this FBE UE may switch to LBE mode for each channel access priority class, high layer signaling may indicate this number for a single channel access priority class. Then, an FBE UE may derive this number for the other channel access priority classes. For example, number-of-FBE-failed-attempts may set this number to N. Then particular offset may be applied to derive this number for other channel access priority classes as shown in Table 3 of the Appendix, as an example. In Table 3, offset values for different channel access priority classes to derive the number of consecutive unsuccessful channel access attempts after which an FBE UE may switch to LBE FIG. 9 illustrates in a flowchart for an example using a counter of unsuccessful channel access attempts to decide whether to switch from FBE operation mode to LBE or switch from one FFP configuration to another or not.

Firstly, the FBE checks whether transmission needs to occur or not. If no transmission required, then no action should be taken by FBE's physical layer (No in step 01). If the FBE has transmission (Yes in step 01), then the FBE attempts to access the channel according to FBE operation mode (step 02).

Next, if the channel is declared to be idle (Yes in step 03), then gNB/TRP or a UE may claim an FBE COT and transmit the intended transmission (step 04). However, if the channel is declared to be unavailable (No in step 03), gNB/TRP or UE increment the counter of unsuccessful channel access attempts by one (step 05).

If the counted number of channel access attempts is less predefined/indicated threshold (No in step 06), gNB/TRP or UE continues operating as FBE at attempt to access the channel according to FBE operation mode (step 02).

If the counted number of channel access attempts is less predefined/indicated threshold (Yes in step 06), gNB/TRP or UE switches to LBE operation mode and attempts to access the channel according to LBE operation mode (step 07).

If the channel is declared to be idle (Yes in step 08), then gNB/TRP or a UE may claim an LBE COT and transmit the intended transmission (step 09). However, if the channel is declared to be unavailable (No in step 08), gNB/TRP or UE attempts to access the channel again as LBE (step 07).

The threshold value may be set to negative value. This means that device may start channel access attempts with LBE instead of operating as FBE and then switching to LBE.

Step 01 may not only be limited to the presence of signal/data to transmit, it may include is there is any signal/data to receive. For example, gNB/TRP may attempt acquire the channel to receive RACH, enable configured grant transmission, allow cross COT transmission and so on. In other words, gNB/TRP try to acquire channel to enable its UE to perform UL transmission. Therefore, it may be beneficial to apply the same procedure of operation mode switching in this case as well.

Other metrics related to the number of unsuccessful channel access attempts to switch from FBE to LBE may be used. Such metrics may relax the requirements of unsuccessful channel access being consecutive.

Average number of failed channel access attempts is one possible metric to switch from FBE to LBE if it exceeds certain threshold. Specifically, the failed channel access attempts do not have to be consecutive. If so many failed attempts occur such that average number of failed channel access attempts exceeds certain threshold, gNB/TRP or UE may switch from FBE to LBE.

The averaging may occur over a predefined duration, e.g., specified per the standard, which may be in units of seconds, milliseconds, slot, sub-frame, radio frame, FFP and so on. Or it may be indicated by high layer signaling, averaging-window-duration RRC parameter for example.

The threshold which the average number of failed channel access attempts is compared against may be predefined and it may vary for different channel access priority classes for the number of consecutive unsuccessful channel access attempts after which operation mode may be changed from FBE to LBE.

Also, the threshold which the average number of failed channel access attempts is compared against may be indicated by high layer signaling for the number of consecutive unsuccessful channel access attempts after which operation mode may be changed from FBE to LBE.

When using the average number of failed channel access attempts instead of the number of unsuccessful channel access attempts, then step 05 in FIG. 9 may be modified to be update the calculated average number of failed channel access attempts. The remaining steps in the flowchart in FIG. 9 do not change.

As yet another possible metric is the probability of channel access failure which may be compared against threshold value. If it exceeds certain threshold, then FBE operation mode may change to LBE operation mode or switch from one FFP configuration to another. The threshold values may be predefined, e.g., specified per the standard and they may depend on the channel access priority class for the number of consecutive unsuccessful channel access attempts after which operation mode may be changed from FBE to LBE or switch from one FFP configuration to another.

Also, the threshold which the probability of channel access failure is compared against may be indicated by high layer signaling for the number of consecutive unsuccessful channel access attempts after which operation mode may be changed from FBE to LBE or switch from one FFP configuration to another.

When using the probability of channel access failure instead of the number of unsuccessful channel access attempts, then step 05 in FIG. 9 may be modified to be update the probability of channel access failure. The remaining steps in the flowchart in FIG. 9 do not change.

Moreover, timer-based criteria may be used to switch from FBE to LBE operation mode or switch from one FFP configuration to another. The timer may be triggered when there is signal/data intended for transmission. If the timer exceeds certain threshold, gNB/TRP or UE may switch from FBE to LBE. The threshold which the timer is compared against may be predefined and may vary depending on channel access priority class for the number for unsuccessful channel access attempts after which the operation mode may change from FBE to LBE. Also, the threshold values may be indicated by high layer signaling.

Figure 10:
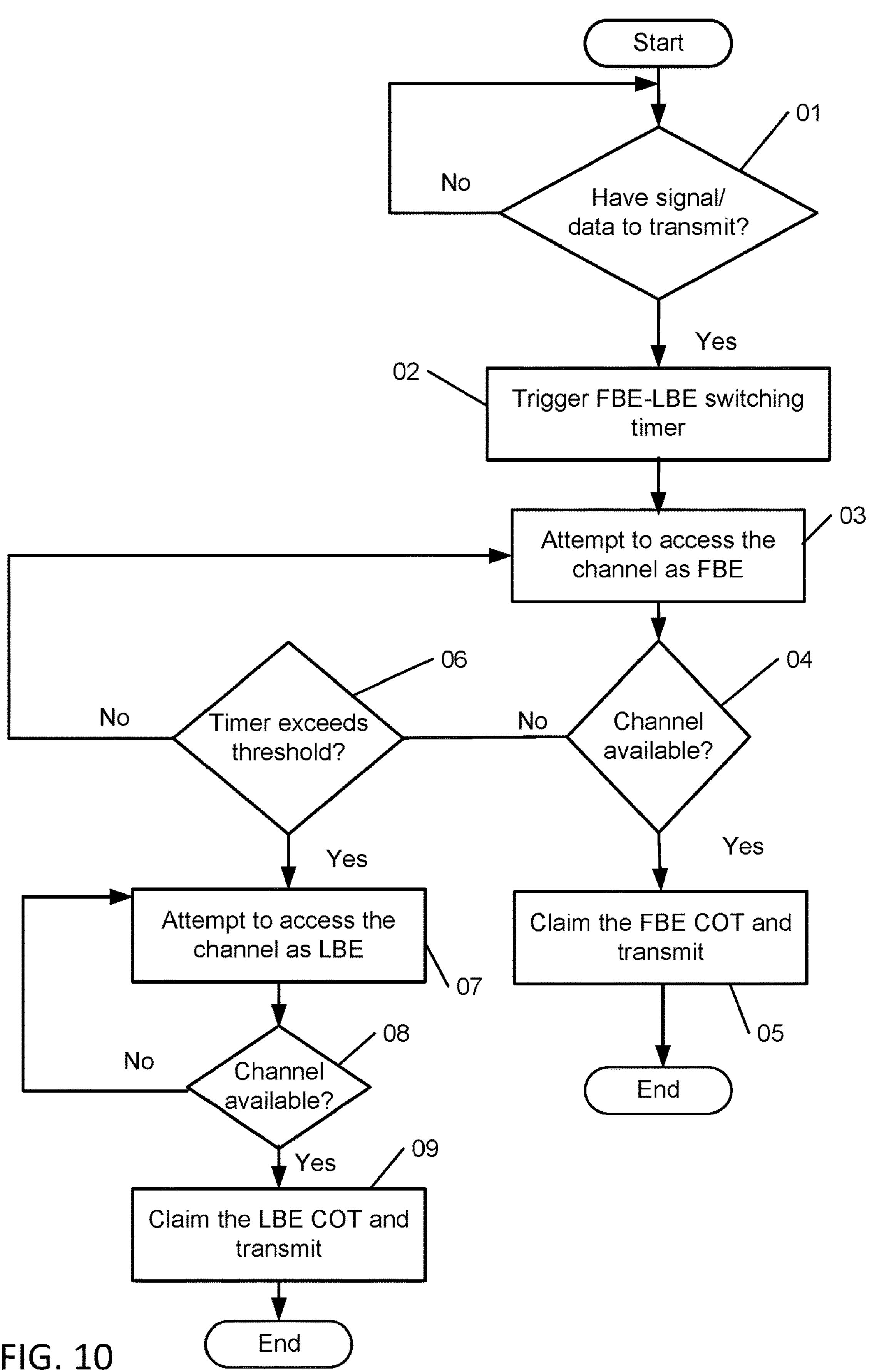
FIG. 10 is a flowchart illustrating an example of timer-based switching from FBE to LBE.

FIG. 10 illustrates the flowchart of timer-based FBE-LBE switching. Most of the steps in FIG. 10 are similar to the corresponding ones in FIG. 9. There are two main differences. The first one is that FBE-LBE switching timer is triggered when there is data/signal to be transmitted (step 02). The second difference is that before attempting to access the channel again, gNB/TRP or UE may check whether the FBE-LBE switching timer value is greater than the predefined/indicated threshold or not (step 06).

After certain number of failed channel access attempts or after certain time of unsuccessful channel access attempts, gNB/TRP/UE to attempt to decode/detect non-intended $CAI_{FBE}$ and/or $CAI_{LBE}$ form the surrounding nodes. Based on acquired information, gNB/TRP/UE may decide whether to switch between FBE-LBE or not. For example, if so many non-intended $CAI_{LBE}$ is received, then this may be an indication that gNB/TRP/UE need to switch to LBE operation mode to be able to compete with the surrounding LBE nodes.

Measurement-Based Switching

Measurements may be used to in deciding whether to switch between FBE and LBE operation mode or switch from one FFP configuration to another. For example, measurements may be used to assess the interference/noise strength in the surrounding environment. In light to medium traffic load, FBE operation mode may be advantageous over LBE operation mode and in this case the measured interference/noise strength are expected to be low, vice versa for high traffic load scenario.

gNB/TRP may conduct L1 and/or L3 measurements to estimate the surrounding interference/noise. Metrics such as Reference Signal Receive Power (RSRP), Received Signal Strength Indicator (RSSI), Signal to Interference plus Noise Ratio (SINR) and so on may be used for this purpose. These metrics are compared versus particular thresholds to decide which operation mode should be selected. Such thresholds may be predefined, e.g., specified per the standard. For example, if the measured SINR is greater than certain threshold, then gNB/TRP may use FBE as operation and vice versa is SINR is smaller than this threshold.

Thresholds may depend on the intended transmission. For example, the threshold values may depend on the channel access priority class. The higher the channel access priority class, the more likely to select LBE rather than FBE operation mode.

UEs associated gNB/TRP may assist it to decide on switching between FBE and LBE or switch from one FFP configuration to another. For example, gNB/TRP may configure periodic/semi-persistent/aperiodic measurements reports for its associated UEs to feedback metrics such as RSRP, RSSI, SINR and so on. Then gNB/TRP may decide based on either the worst measurement or the average measurement or the best measurement and compare it to the predefined threshold.

To reduce the reporting overhead, UEs associated with a gNB/TRP may locally decide on whether FBE or LBE is preferable operation mode. Then 1-bit feedback to the serving gNB/TRP may be used to indicate whether FBE or LBE is selected. Based on this feedback, gNB/TRP may decide which operation mode should be selected. For example, a decision may be made based on the majority rule.

To this end, the existing channel state information measurements framework supports configuring the connected UEs to measure RSRP and/or RSSI and/or SINR. Here, UEs may be configured with the thresholds that should be used to decide whether LBE or FBE is preferred. For example, high layer signaling may be used to indicate the applied thresholds. RSRP-thresholdSSB and/or RSRP-thresholdCSIRS, RRC parameters for example, may indicate the RSRP threshold if SSB and/or CSI-RS are used for the measurements, respectively. If the measured RSRP is greater than the indicated threshold, UE may assume that FBE operation is the preferable operation mode and vice versa if the measured RSRP is less than the indicated threshold. Similarly, RSSI-thresholdSSB and/or RSSI-thresholdCSIRS and/or SINR-thresholdSSB and/or SINR-thresholdCSIRS, RRC parameters, may indicate the threshold for RSSI and SINR if measured by SSB and/or CSI-RS, respectively.

These RRC parameters that configure the threshold values may transmitted as part of RRC IE that is scheduled by a UE-specific DCI or a GC-PDCCH.

The locally selected operation mode may be reported as part of CSI reporting. A new report quantity for report Quantity, which is an RRC parameter in CSI-ReportConfi IE, and may be called FBE-LBE, for example. If 1 is reported, then FBE operation mode is selected, and vice versa if 0 is reported.

As yet another metric to decide switching between FBE-LBE, gNB/TRP may use the received ACK-NACK to decide whether to switch between FBE and LBE or not. If so, many NACKs are received at gNB/TRP, this may be considered as indication on strong interference/noise in the environment surrounding this UE and hence LBE operation mode is preferable.

The number of NACK may be compared versus particular threshold. If the number of collected NACK in particular time window is greater than this threshold, then LBE is the preferred operation mode. The value of the threshold may be predefined, e.g., specified per the standard.

NACK threshold may depend on the transmission. For example, high priority transmission class may have smaller NACK threshold than low priority transmission class. Consequently, if so, many NACK are received for high priority transmission class, gNB/TRP may switch faster from FBE to LBE.

Switching from LBE to FBE

If an LBE, e.g., gNB/TRP/UE, intends to switch to be an FBE with certain configurations, then the switching may occur at the beginning of the first FFP based on FBE configurations intended to be used for the communication. This is beneficial to keep FFP aligned if other nodes intend to use the same FBE configurations.

Figure 11:
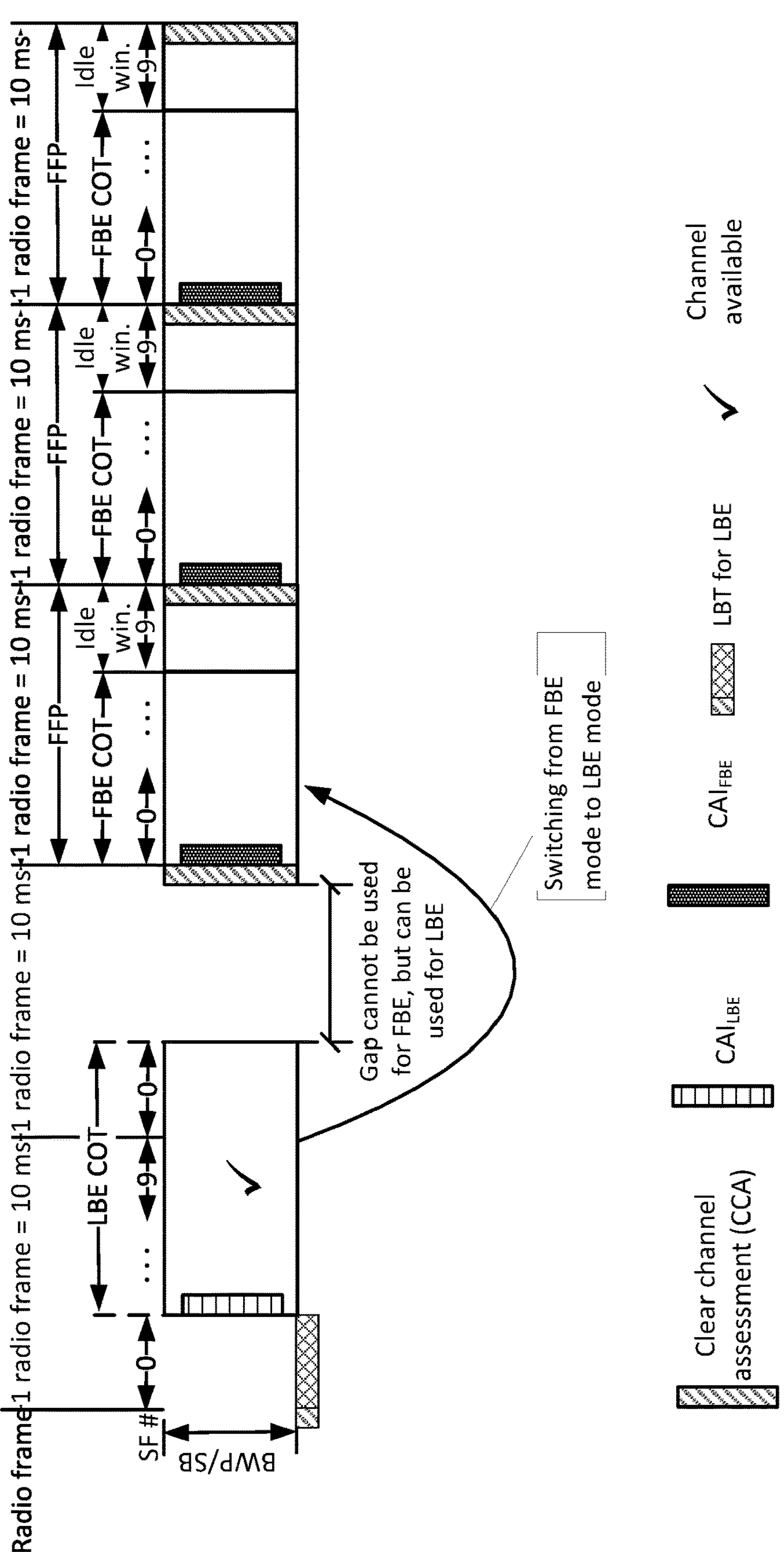
FIG. 11 is a timing diagram of an example procedure for switching from LBE to FBE.

FIG. 11 shows an example of an LBE that intends to switch from LBE to FBE operation mode with FFP equal to one radio frame starting form sub-frame 0. In this example, LBE node acquires LBE COT of 10 ms as shown in the FIG. 11 crossing the boundary of the next radio frame. Consequently, the node cannot start operating as FBE in this radio frame and it shall wait to the next radio which is aligned with the beginning of FFP. The gap between the last LBE COT and potential FBE COT may be used to start another LBE COT, but not start FBE COT. Also, there should be gap reserved for conducting CCA before the beginning of FFP.

Switching from FBE to LBE

One possibility for switching from FBE operation mode to LBE operation mode is that FBE has to be operating with the current used FBE configurations for a duration equal to the minimum time to keep using the same FFP as provided in regulation requirements. For example, regulation requirements mandate that FFP cannot be changed more than once every 200 mS. Consequently, for a node to switch from FBE to LBE, it shall be using the current FBE configurations for at least 200 mS, for example.

Figure 12:
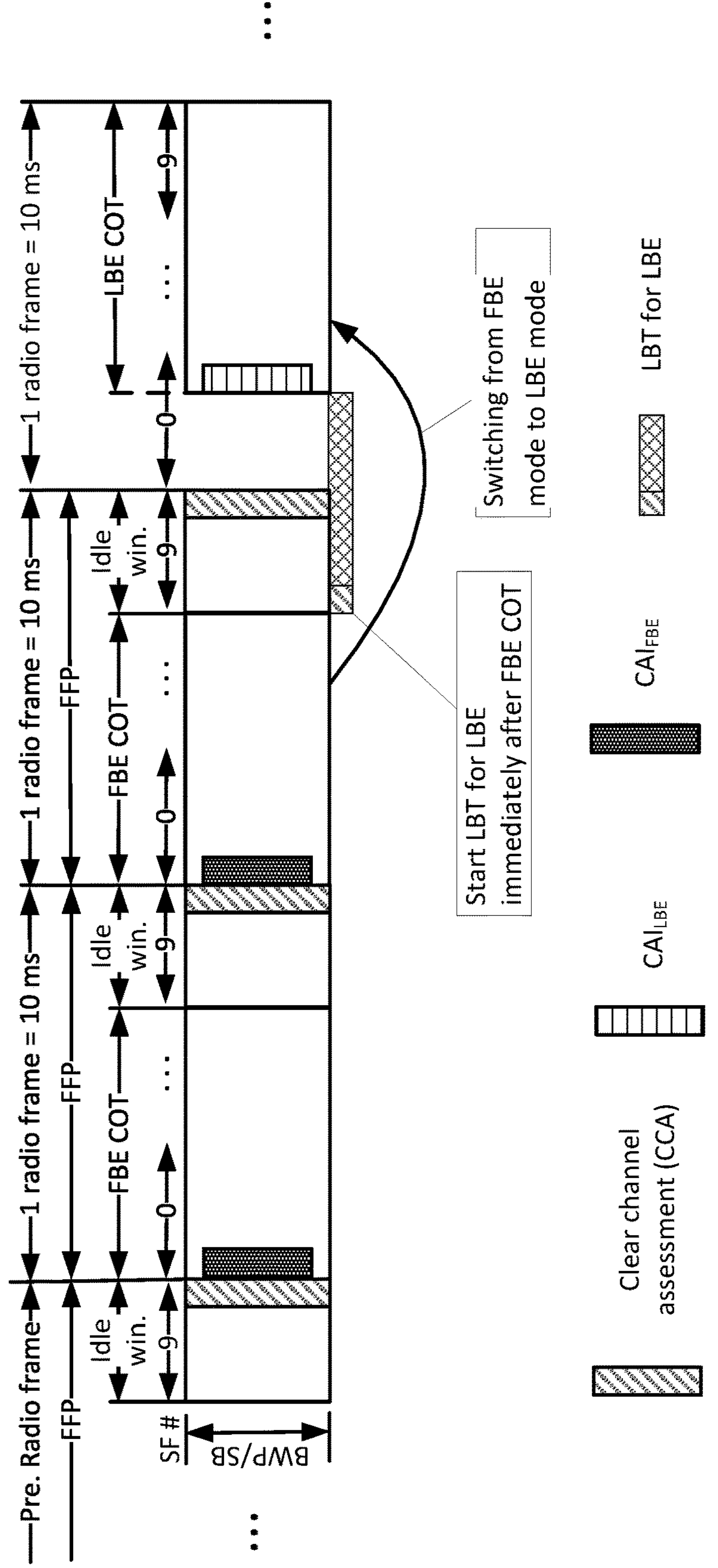
FIG. 12 is a timing diagram of an example of FBE to LBE switching immediately after the end of the FBE COT.

Alternatively, FBE may switch immediately after the end of current FBE COT. This is exemplified in FIG. 12 in which LBT for LBE operation mode starts immediately after the end FBE COT.

Figure 13:
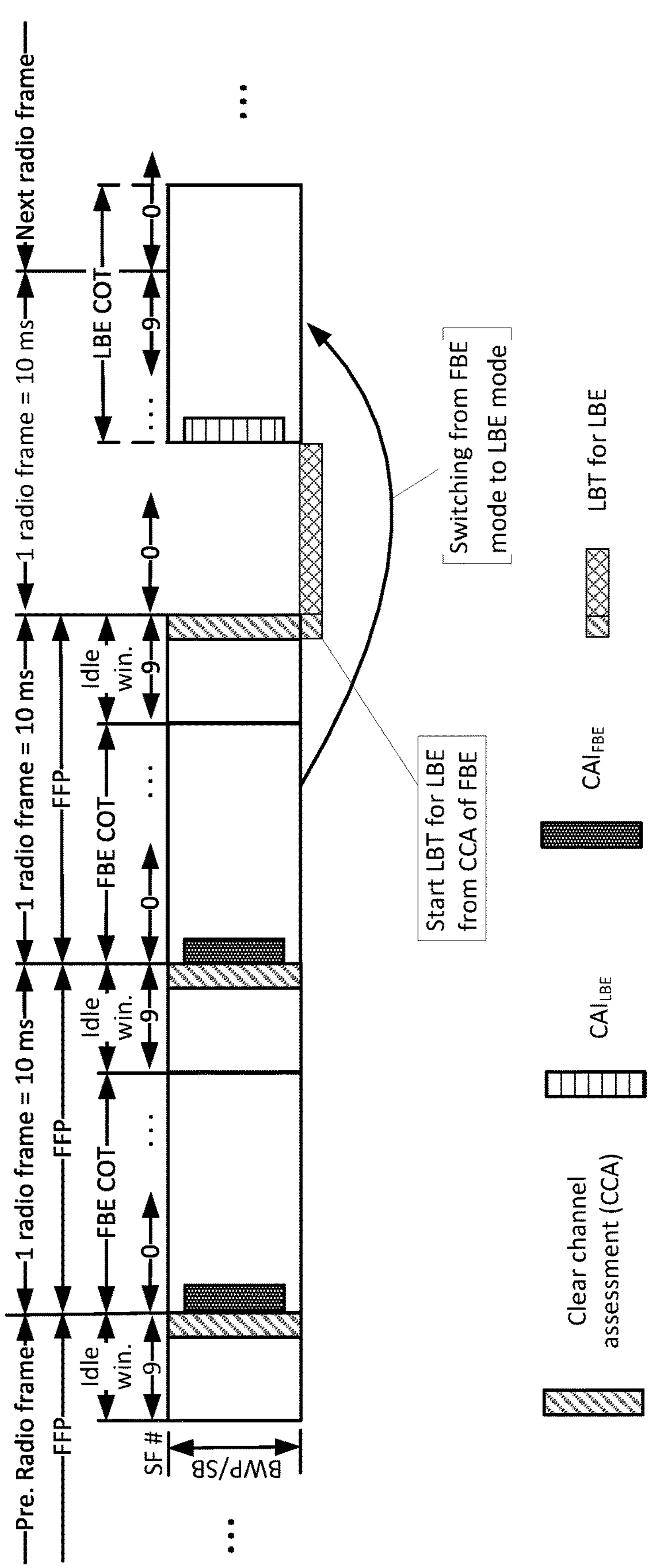
FIG. 13 is a timing diagram of an example of FBE to LBE switching, wherein the LBT of LBE may start with the beginning of CCA of FBE.

As yet another possible solution, LBT for LBE operation may start with the beginning of CCA of FBE as shown in FIG. 13, for example. In the example of FIG. 13, for FBE to LBE switching, the LBT of LBE may start with the beginning of CCA of FBE.

Please note that the descried procedures for switching between FBE and LBE may be applied for switching between particular FFP configurations to another. Regulation may impose additional constraints such as switching between different FFP configurations may occur after using the old configurations for certain period of time such as 200 ms. The minimum time for switching between different FFP configurations may be specified, provided in specs, or signaled through high layer signaling such as RRC parameters.

Network Controlled Switching with Explicit Indication

A gNB/TRP may explicitly indicate switching between FBE and LBE. The indication may carry the following information: Indication of switching which may be 1-bit field and if it is set to zero, then the network intends to switch to LBE mode, and if it is set to one, then the network intends to switch to FBE mode. Alternatively, toggling this 1-bit field indicates that the network intends to switch from current operation mode to the new one. If this 1-bit field is not toggled, then the current operation mode is still valid.

Since this explicit indication may be repeated several times, it may carry information on when the switching may occur. Each switch indication may carry the relative duration between the last symbol carrying the indication and the first symbol from which the network switches the operation mode.

Figure 14:
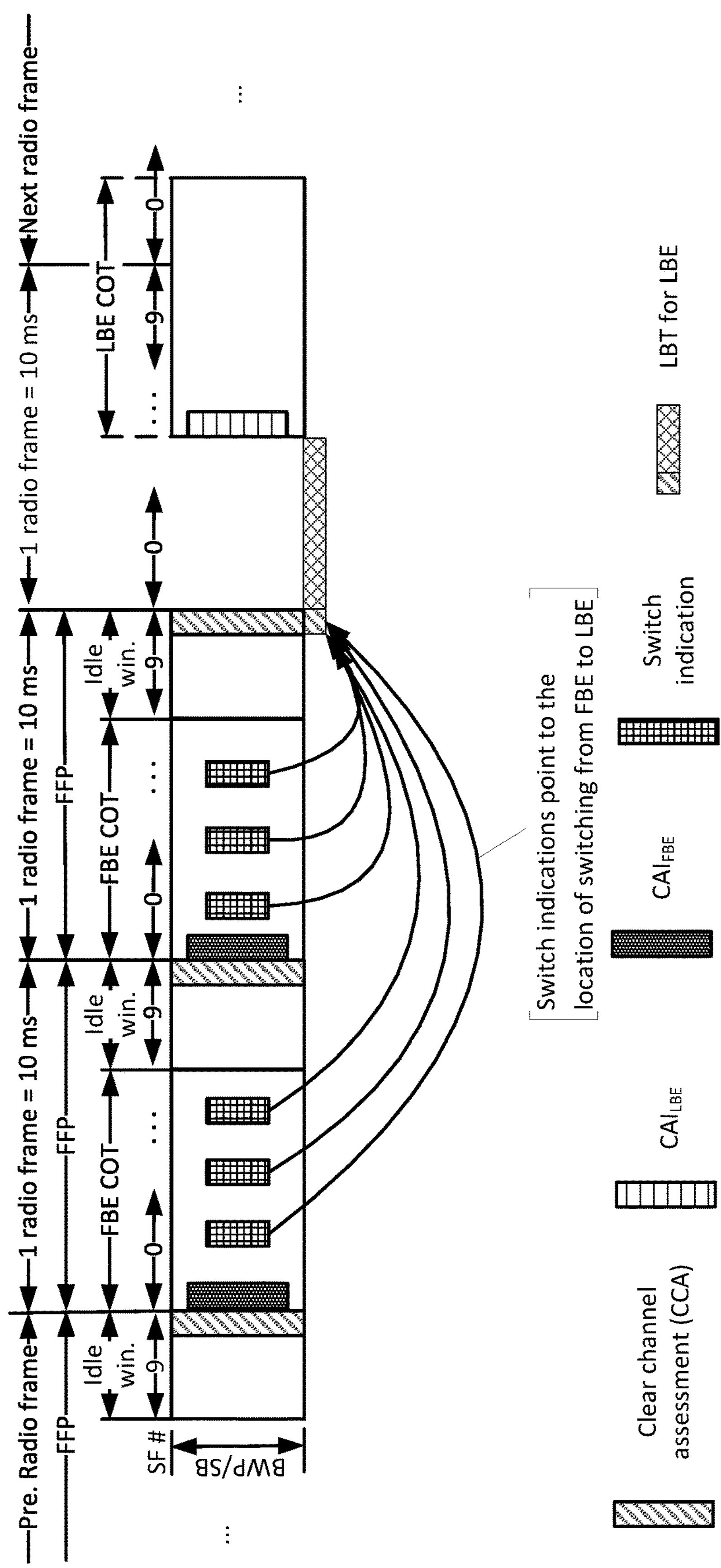
FIG. 14 is a timing diagram of an example of switch indication carrying 1-bit field indicating operation mode switching and a location of switching.

FIG. 14 shows an example of a network switching from FBE operation mode to LBE operation mode. Moreover, switch indication is intended to be transmitted in multiple occasions. Each switch indication carrying 1-bit field to indicate operation mode switch and carry the relative location from the indication to the point at which switching occur. The same approach can be used for switching from LBE to FBE.

Also, a switch indication may carry the absolute location, not the relative location, of the point at which switching is intended to occur such that UEs may combine these switch indications in case they operate at low SINR scenario.

Either the switch indication carries the absolute or relative location of the point at which switching is intended to occur, if a UE received and successfully decoded/detected this indication, this UE is not required to keep looking for this switch indication.

The switch indication may be carrier through multiple channel. The SSB may carry the 1-bit field to indicate operation mode switching. It may be carrier PBCH pay load, not in the MIB to avoid affecting the soft combing of the MIB.

An RMSI PDCCH and/or RMSI Physical Downlink Shared Channel (PDSCH) may carry this indication. For example, the RMSI PDCCH may carry the 1-bit field indicating if the operation mode is intended to be switched or not, while the RMSI PDSCH may carry the location of the intended operation mode switching. The RMSI PDSCH may carry both 1-bit field indicating the intent of switching the operation mode and location of this intended switch, no indication in RMSI PDCCH.

A GC-PDCCH or UE specific PDCCH may carry both 1-bit field indicating the intent of switching the operation mode and location of this intended switch.

If $CAI_{FBE}$ or $CAI_{LBE}$ is PDCCH, then they may carry both 1-bit field indicating the intent of switching the operation mode and/or location of this intended switch.

For UEs in RRC idle/inactive state, a 1-bit field indicating the intent of switching the operation mode may be carried by paging DCI or wake-up signal (WUS). Upon reception such indication, UEs in RRC idle/inactive state are expected to switch to RRC connected state to get information about the intended switch location.

For those UEs in RRC idle/inactive state, they may not go to full RRC connected mode. For example, once they start RACH procedures, they may get information about the location of the intended operation mode switching in Msg2. Then, no need to complete the remaining steps of RACH, e.g., Msg3 and Msg4. For this purpose, some preambles may be reserved for this purpose such that gNB/TRP can distinguish whether this preamble transmission is for initial access or for getting information the location of the intended location of operation mode switching.

UEs in RRC idle/inactive state may use a 2-step RACH to get information about the location of the intended operation mode switching. The purpose of this 2-step RACH may be indicated in the preamble part of MsgA or in the PUSCH of MsgA.

Implicit Indication

Here DL reference signals may be used to indicate the network intends to switch the operation mode, in addition to their original purposes.

For example, if $CAI_{FBE}$ or $CAI_{LBE}$ is DL RS such as wideband DMRS/CSI-RS, for example, then a DMRS/CSI-RS sequence may indicate whether the gNB/TRP intends to switch the operation mode or not. For example, two DMRS/CSI-RS scrambling initialization sequences may be indicated to the UEs, through high layer signaling such as RRC parameters Operation-switching-scramblingID and No-Operation-switching-scramblingID, for example.

Also, if $CAI_{FBE}$ or $CAI_{LBE}$ is PDCCH, then PDCCH DMRS sequence may indicate whether the network intends to switch the operation mode or not. For example, two DMRS scrambling initialization sequences may be indicated to the UEs, through high layer signaling such as RRC parameters Operation-switching-scramblingID and No-Operation-switching-scramblingID, for example.

Moreover, if $CAI_{FBE}$ or $CAI_{LBE}$ is PDCCH, the CRC scrambling RNTI may indicate whether the network intends to switch the operation mode or not. UEs may be configured with two RNTI one to indicating no operation mode switching is intended and other to indicate operation mode switching. High layer parameters may be used to indicate these RNTI values such as RRC parameters Operation-switching-RNTI and No-Operation-switching-RNTI, for example.

For UEs in RRC idle/inactive states, the CRC scrambling RNTI of paging DCI or WUS may be used to indicate whether the network intends to switch the operation mode or not.

Also, for those UEs in RRC idle/inactive states, the DMRS sequence paging PDCCH or WUS PDCCH may indicate whether the network intends to switch the operation mode or not.

Due to the limited capabilities of implicit indication, information about the when the network intends to switch the operation mode cannot be conveyed with limited complexity. A UE may receive an implicit indication of operation mode switching.

For example, receiving the implicit indication may trigger the UE to monitor PDCCH with certain configuration to obtain information about when the network intends to switch the operation mode.

In case that gNB/TRP provided multiple FBE configurations and each one is associated with particular ID, FBE-configID RRC parameter described earlier for example. In this case, more bits are needed to indicate the selected operation mode and its configuration. Explicit or implicit indications may be applied with more bits allocated for this purpose. Table 4 of the Appendix shows an example of 3-bits indication used to indicate the selected operation mode. For example, the code point “000” may be reserved to indicate the LBE operation mode, while the remaining code points are used to indicate which FBE configurations is selected, FBE-configID.

UE Autonomous Switching

An operation mode that is autonomously selected by a UE may then be indicated to the gNB/TRP serving the UE. For example, a UE may autonomously switch the operation mode or switch from one FFP configuration to another for a UL transmission initiated by a UE. For example, if a UE failed to access the channel for an extended period of time to transmit RACH or configured grant, for example, it may switch from FBE to LBE. Therefore, gNB/TRP should be aware of this switching because it may affect procedures related to COT sharing, for example.

RACH Transmission

RACH preambles/RACH occasions may indicate the selected operation mode. For example, gNB/TRP may configure non-overlapping RACH preambles/RACH occasions for FBE and LBE operation mode. Consequently, when a UE transmits RACH, it shall select RACH preamble/RACH occasion associated with applied channel access procedure.

Also, in 4 steps RACH, a Msg3 PUSCH may be used to indicate whether LBE or FBE operation mode is selected. Moreover, a DMRS sequence/pattern of Msg3 may be used to indicate the selected operation mode.

For 2-step RACH, the preamble and RACH occasions of MsgA may be used to indicate the selected operation mode. A PUSCH part of MsgA may indicate the selected operation mode. Either by explicitly carrying 1-bit indicating the selected operation mode or by implicitly selecting the DMRS sequence/pattern of PUSCH that convey the selected operation mode.

Moreover, in Msg3 of 4-step RACH or PUSCH part of MsgA in 2-step RACH, a UE may transmit a piggybacked UCI that convey a 1-bit field indicating the selected operation mode by the UE.

An FBE UE may perform initial access as LBE to increase the chance of accessing the channel. Then it may switch to FBE after becoming in RRC connected mode and receiving the RRC configurations.

Figure 15:
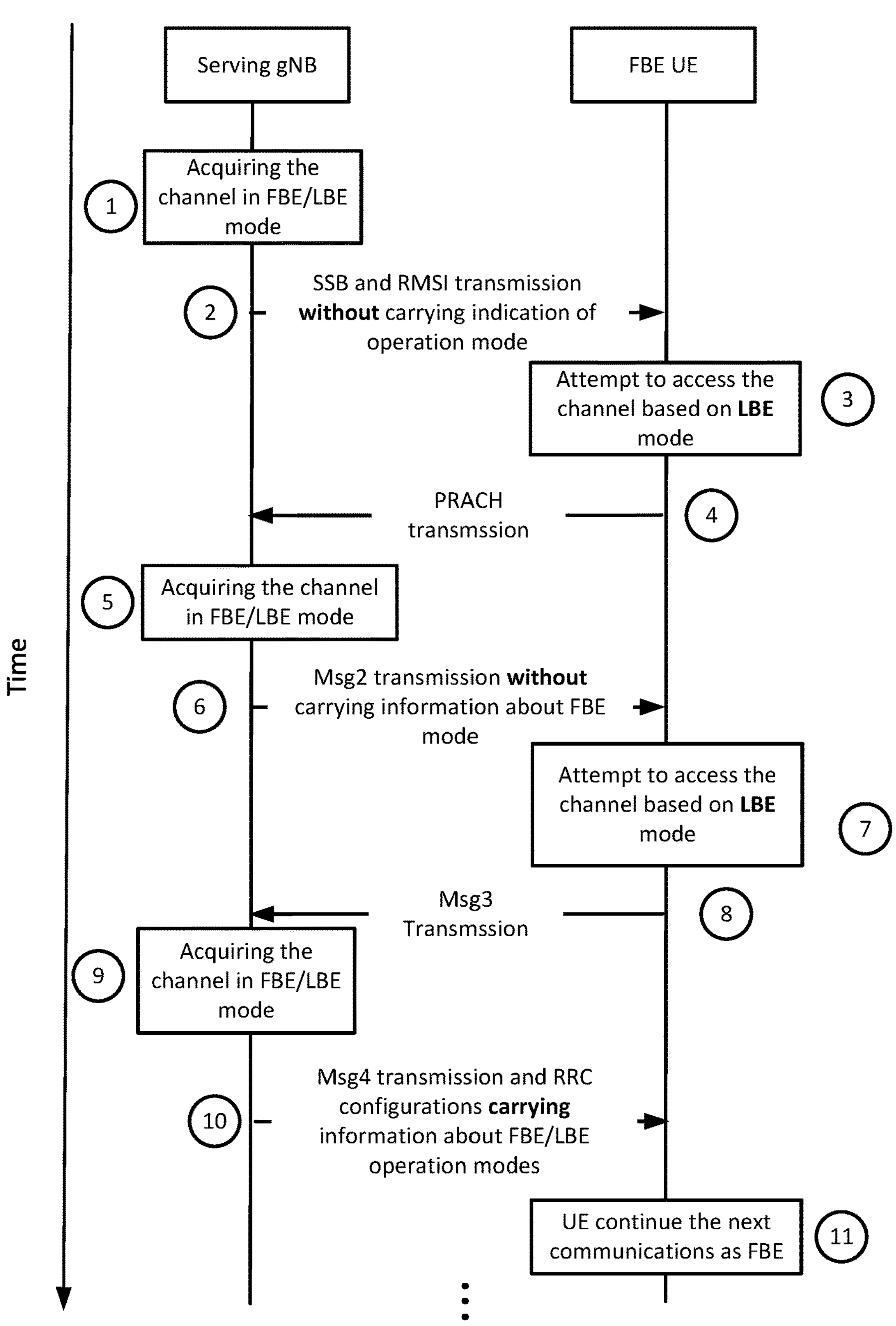
FIG. 15 is a call flow of an example in which an FBE UE conducts channel access as LBE.

FIG. 15 shows an example in which gNB/TRP may operate in FBE/LBE mode, which may be transparent to an FBE UE attempting to perform initial access. Specifically, gNB/TRP applies channel access procedures based on FBE/LBE operation mode (steps 1, 5, 9) for SSB/RMSI, Msg2 and Msg4 transmission (steps 2, 6, 10), respectively. On the other hand, UE may operate in LBE mode to access the channel (steps 3, 7) for PRACH and Msg3 transmission (steps 4, 8), respectively to increase the chance of a UE to successfully access the channel. Once the UE is RRC connected mode, it receives the FBE configurations and then operates as FBE for the next communication with the gNB/TRP.

Also, the FBE UE may receive the FBE configurations before being in RRC connected mode, for example in Msg2. In this case, the UE shall operate as LBE until FBE is received and then follow the provided FBE configurations.

A UE may indicate to the serving gNB/TRP how the UE acquired the channel .

Configured Grant

For configured UL transmission in a UE initiated COT, a UE may transmit a piggybacked UCI that convey a 1-bit field indicating the selected operation mode by the UE.

Also, the UL DMRS of PUSCH may indicate the selected operation mode by having two different set of UL DMRS configurations, e.g., sequence and pattern, and each configuration is associated with particular operation mode. A UE shall select the DMRS configurations that is associated with the selected operation pattern.

Moreover, different PUSCH scrambling RNTI may be used to indicate the selected operation mode.

Example Operating Environments

The 3rd Generation Partnership Project (3GPP) develops technical standards for cellular telecommunications network technologies, including radio access, the core transport network, and service capabilities - including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 16A:
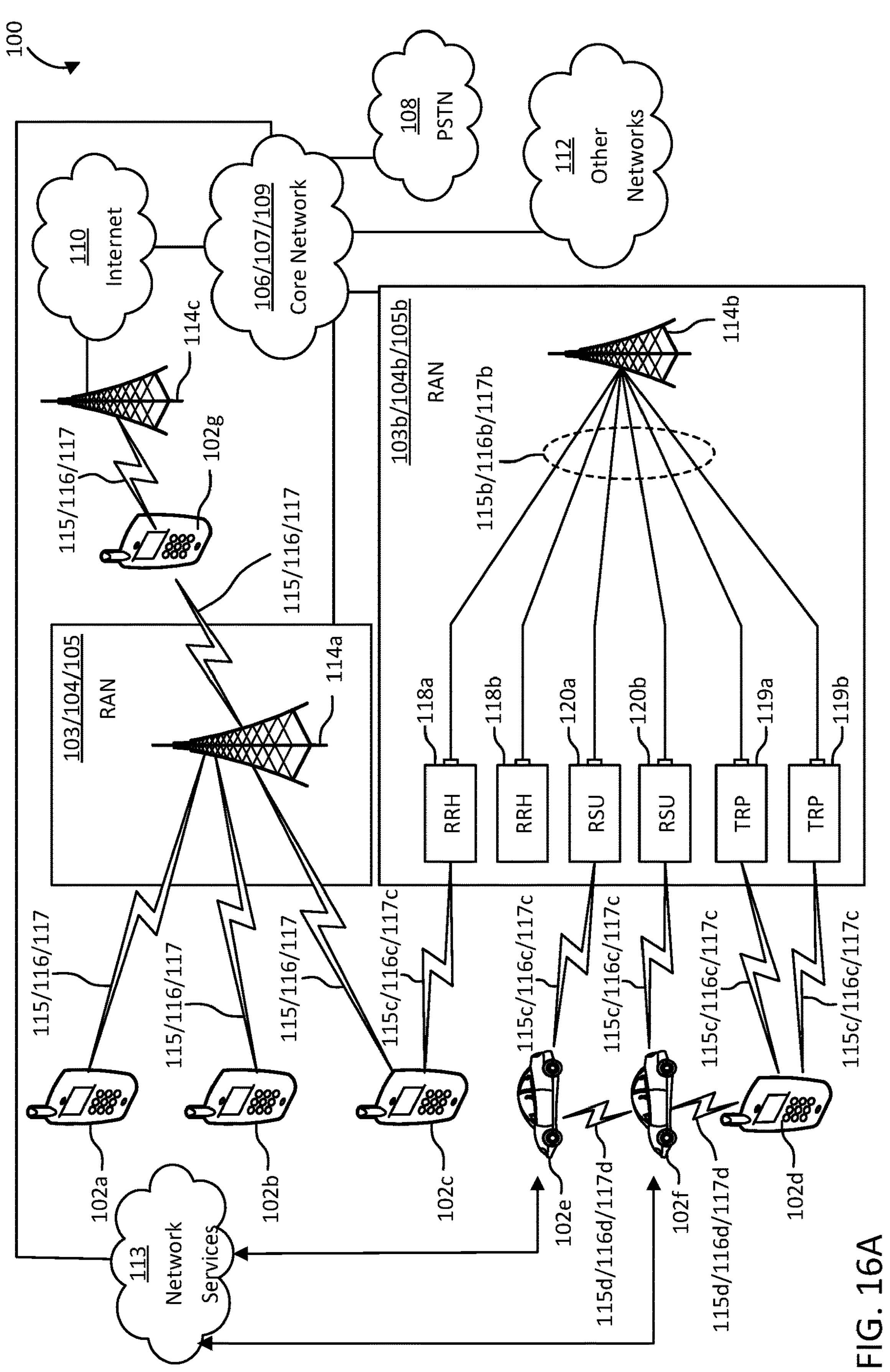
FIG. 16A illustrates an example communications system in which the methods and apparatuses described and claimed herein may be embodied.

FIG. 16A illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, 102*d*, 102*e*, 102*f*, and/or 102*g* (which generally or collectively may be referred to as WTRU 102), a radio access network (RAN) 103/104/105/103*b*/104*b*/105*b*, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102*a*, 102*b*, 102*c*, 102*d*, 102*e*, 102*f*, 102*g* may be any type of apparatus or device configured to operate and/or communicate in a wireless environment. Although each WTRU 102*a*, 102*b*, 102*c*, 102*d*, 102*e*, 102*f*, 102*g* is depicted in FIGS. 16A-16E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114*a* and a base station 114*b*. Base stations 114*a* may be any type of device configured to wirelessly interface with at least one of the WTRUs 102*a*, 102*b*, 102*c* to facilitate access to one or more communication networks, such as the core network 106/107/109, the Internet 110, and/or the other networks 112. Base stations 114*b* may be any type of device configured to wiredly and/or wirelessly interface with at least one of the RRHs (Remote Radio Heads) 118*a*, 118*b*, TRPs (Transmission and Reception Points) 119*a*, 119*b*, and/or RSUs (Roadside Units) 120*a* and 120*b* to facilitate access to one or more communication networks, such as the core network 106/107/109, the Internet 110, the other networks 112, and/or V2X server (or ProSe function and server) 113. RRHs 118*a*, 118*b* may be any type of device configured to wirelessly interface with at least one of the WTRU 102*c*, to facilitate access to one or more communication networks, such as the core network 106/107/109, the Internet 110, and/or the other networks 112. TRPs 119*a*, 119*b* may be any type of device configured to wirelessly interface with at least one of the WTRU 102*d*, to facilitate access to one or more communication networks, such as the core network 106/107/109, the Internet 110, and/or the other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, the other networks 112, and/or V2X server (or ProSe function and server) 113. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a* and 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPs 119*a*, 119*b*, and/or RSUs 120*a*, 120*b*, in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.)

In an embodiment, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b*, in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 16A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet another embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 16A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 16A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/

105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d*, and 102*e* may include multiple transceivers for communicating with different wireless networks over different wireless links. For example, the WTRU 102*e* shown in FIG. 16A may be configured to communicate with the base station 114*a*, which may employ a cellular-based radio technology, and with the base station 114*c*, which may employ an IEEE 802 radio technology.

Figure 16B:
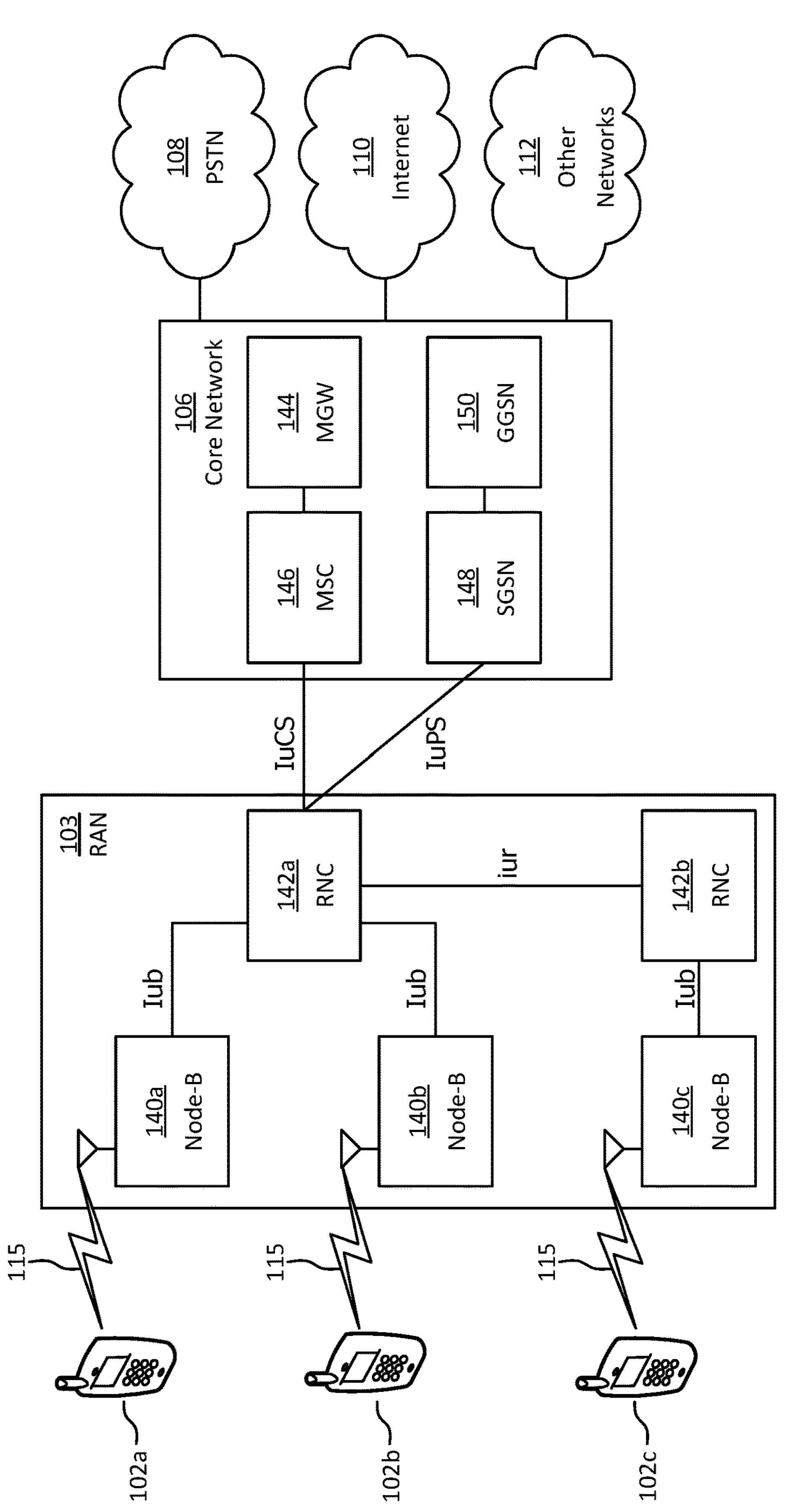
FIG. 16B is a block diagram of an example apparatus or device configured for wireless communications.

FIG. 16B is a block diagram of an example apparatus or device configured for wireless communications in accordance with the embodiments illustrated herein, such as for example, a WTRU 102. As shown in FIG. 16B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 16B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 16B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 16B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. The WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*)

and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 16C:
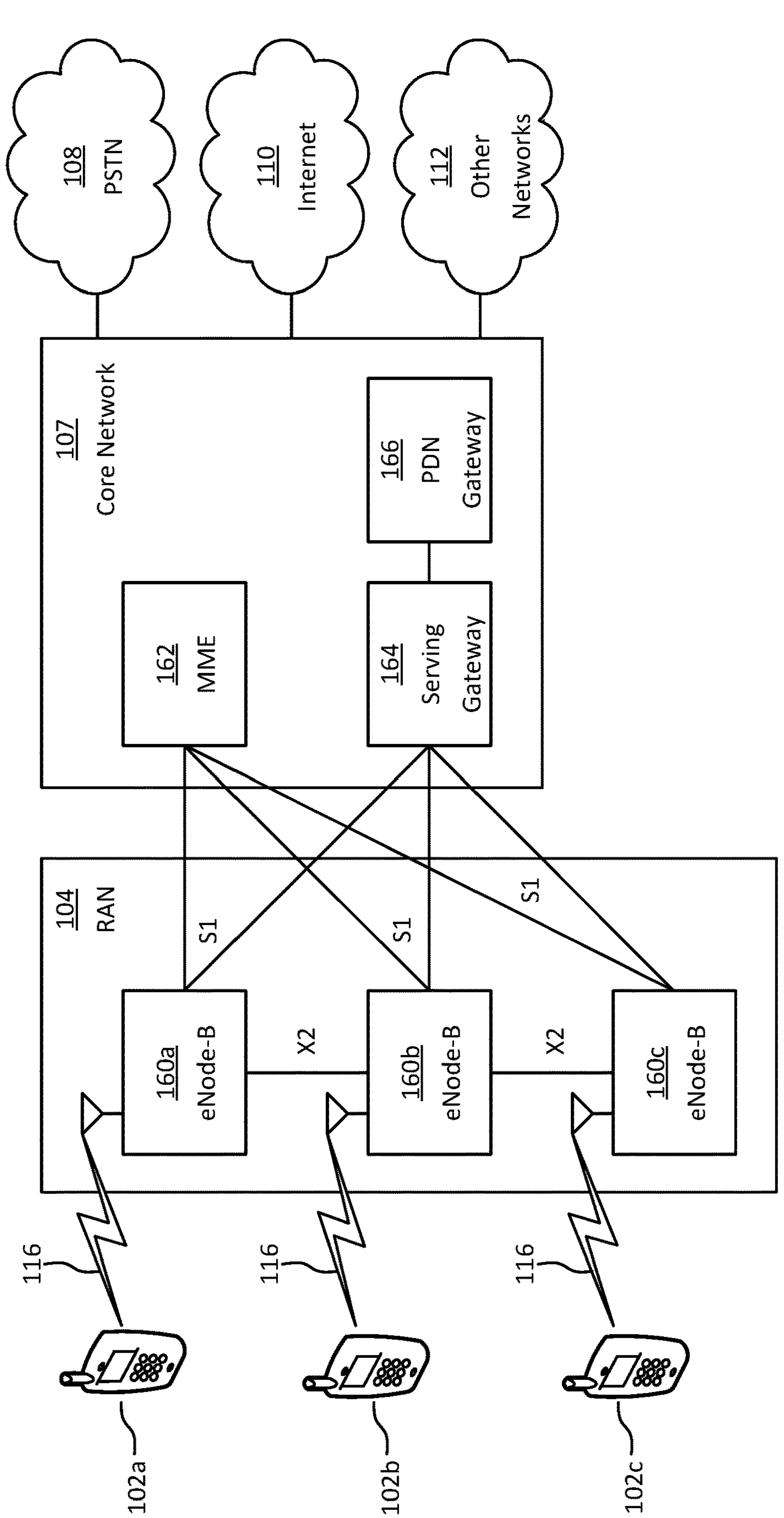
FIG. 16C is a system diagram of an example radio access network (RAN) and core network.

FIG. 16C is a system diagram of the RAN 103 and the core network 106 according to an embodiment. The RAN 103 may employ a UTRA radio technology to communicate with the WTRUs 102*a*, 102*b*, and 102*c* over the air interface 115. The RAN 103 may also be in communication with the core network 106. As shown in FIG. 16C, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 16C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*,142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macro-diversity, security functions, data encryption, and the like.

The core network 106 shown in FIG. 16C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

The core network 106 may also be connected to the networks 112, which may include other wired or wireless networks that are owned and/or operated by other service providers.

Figure 16D:
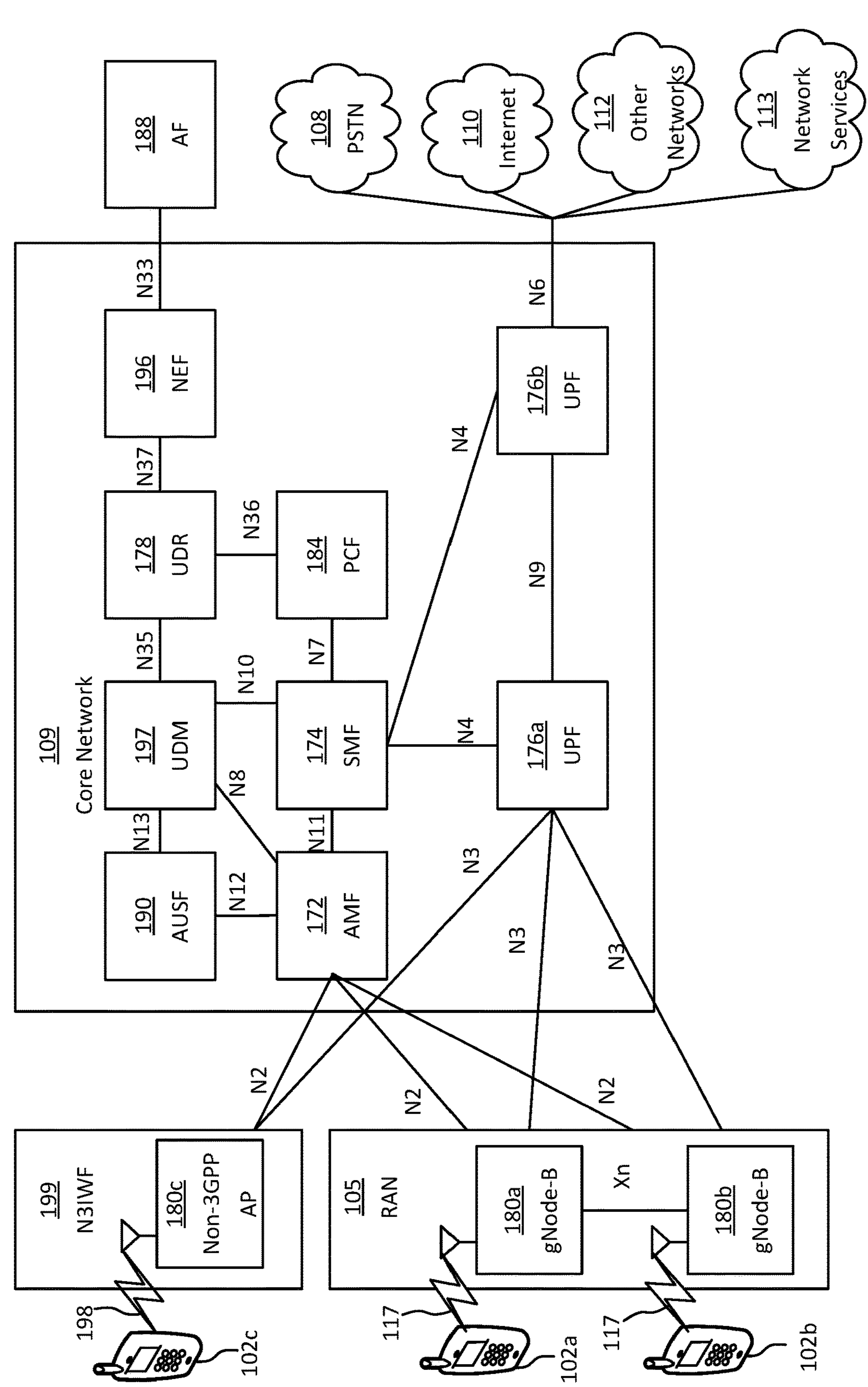
FIG. 16D is a system diagram of another example RAN and core network.

FIG. 16D is a system diagram of the RAN 104 and the core network 107 according to an embodiment. The RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 16D, the eNode-Bs 160*a*, 160*b*, 160*c* may communicate with one another over an X2 interface.

The core network 107 shown in FIG. 16D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102_a_, 102_b_, 102_c_, managing and storing contexts of the WTRUs 102_a_, 102_b_, 102_c_, and the like.

The serving gateway 164 may also be connected to the PDN gateway 166, which may provide the WTRUs 102_a_, 102_b_, 102_c_ with access to packet-switched networks, such as the Internet 110, to facilitate communications between the WTRUs 102_a_, 102_b_, 102_c_ and IP-enabled devices.

The core network 107 may facilitate communications with other networks. For example, the core network 107 may provide the WTRUs 102_a_, 102_b_, 102_c_ with access to circuit-switched networks, such as the PSTN 108, to facilitate communications between the WTRUs 102_a_, 102_b_, 102_c_ and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102_a_, 102_b_, 102_c_ with access to the networks 112, which may include other wired or wireless networks that are owned and/or operated by other service providers.

Figure 16E:
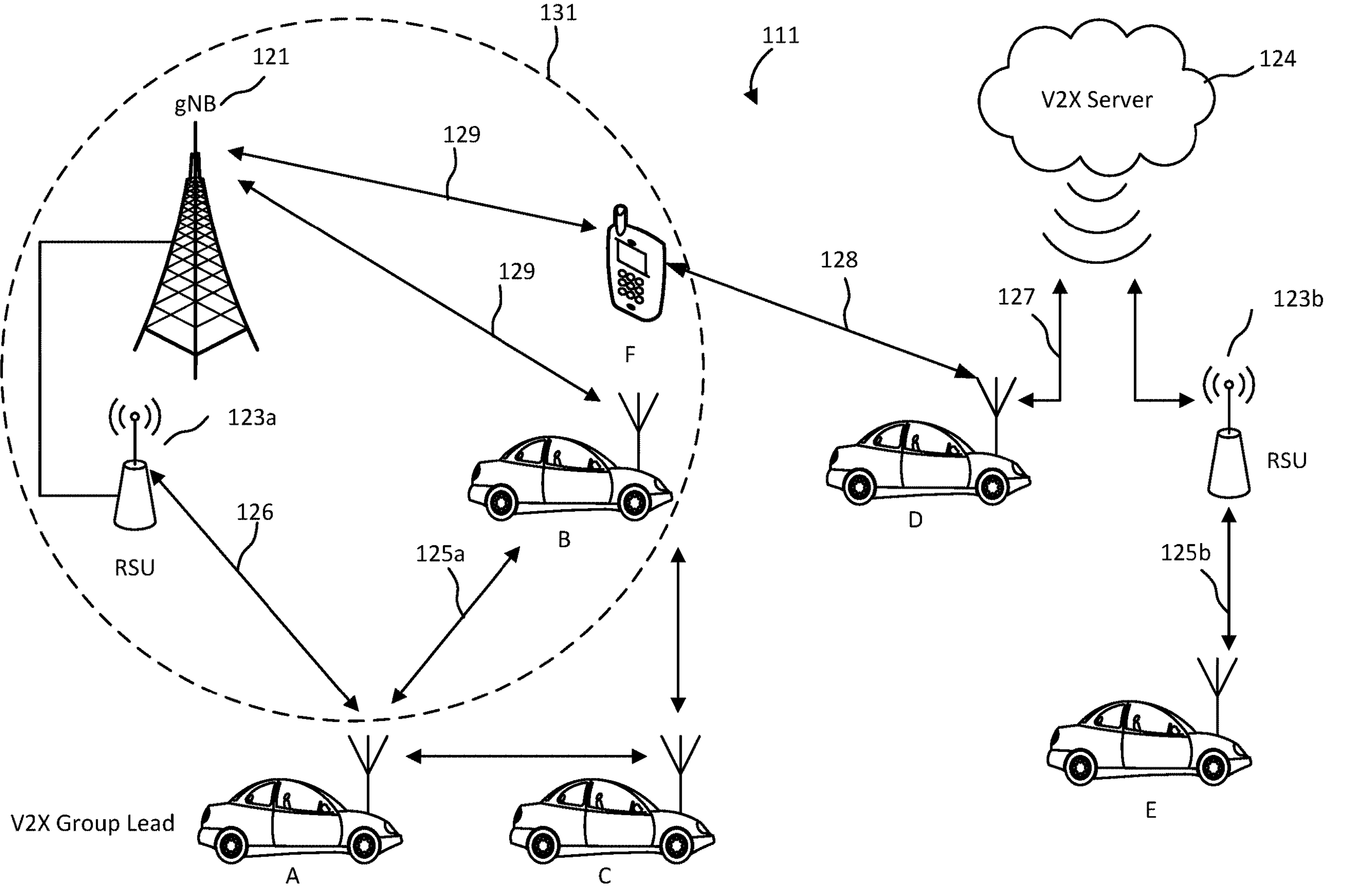
FIG. 16E is a system diagram of another example RAN and core network.

FIG. 16E is a system diagram of the RAN 105 and the core network 109 according to an embodiment. The RAN 105 may be an access service network (ASN) that employs IEEE 802.16 radio technology to communicate with the WTRUs 102_a_, 102_b_, and 102_c_ over the air interface 117. The communication links between the different functional entities of the WTRUs 102_a_, 102_b_, 102_c_, the RAN 105, and the core network 109 may be defined as reference points.

As shown in FIG. 16E, the RAN 105 may include base stations 180_a_, 180_b_, 180_c_, and an ASN gateway 182, though it will be appreciated that the RAN 105 may include any number of base stations and ASN gateways while remaining consistent with an embodiment. The base stations 180_a_, 180_b_, 180_c_ may each be associated with a particular cell in the RAN 105 and may include one or more transceivers for communicating with the WTRUs 102_a_, 102_b_, 102_c_ over the air interface 117. In an embodiment, the base stations 180_a_, 180_b_, 180_c_ may implement MIMO technology. Thus, the base station 180_a_, for example, may use multiple antennas to transmit wireless signals to, and receive wireless signals from, the WTRU 102_a_. The base stations 180_a_, 180_b_, 180_c_ may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102_a_, 102_b_, 102_c_ and the RAN 105 may be defined as an R1 reference point that implements the IEEE 802.16 specification. In addition, each of the WTRUs 102_a_, 102_b_, and 102_c_ may establish a logical interface (not shown) with the core network 109. The logical interface between the WTRUs 102_a_, 102_b_, 102_c_ and the core network 109 may be defined as an R2 reference point, which may be used for authentication, authorization, IP host configuration management, and/or mobility management.

The communication link between each of the base stations 180_a_, 180_b_, and 180_c_ may be defined as an R8 reference point that includes protocols for facilitating WTRU handovers and the transfer of data between base stations. The communication link between the base stations 180_a_, 180_b_, 180_c_ and the ASN gateway 182 may be defined as an R6 reference point. The R6 reference point may include protocols for facilitating mobility management based on mobility events associated with each of the WTRUs 102_a_, 102_b_, 102_c_.

As shown in FIG. 16E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102_a_, 102_b_, and 102_c_ to roam between different ASNs and/or different core networks. The MIP-HA 184 may provide the WTRUs 102_a_, 102_b_, 102_c_ with access to packet-switched networks, such as the Internet 110, to facilitate communications between the WTRUs 102_a_, 102_b_, 102_c_ and IP-enabled devices. The AAA server 186 may be responsible for user authentication and for supporting user services. The gateway 188 may facilitate interworking with other networks. For example, the gateway 188 may provide the WTRUs 102_a_, 102_b_, 102_c_ with access to circuit-switched networks, such as the PSTN 108, to facilitate communications between the WTRUs 102_a_, 102_b_, 102_c_ and traditional land-line communications devices. In addition, the gateway 188 may provide the WTRUs 102_a_, 102_b_, 102_c_ with access to the networks 112, which may include other wired or wireless networks that are owned and/or operated by other service providers.

Although not shown in FIG. 16E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102_a_, 102_b_, 102_c_ between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 16A, 16C, 16D, and 16E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 16A, 16B, 16C, 16D, and 16E are provided by way of example only, and it is understood that the subject matter disclosed and claimed herein may be embodied or implemented in any similar communication system, whether presently defined or defined in the future.

Figure 16F:
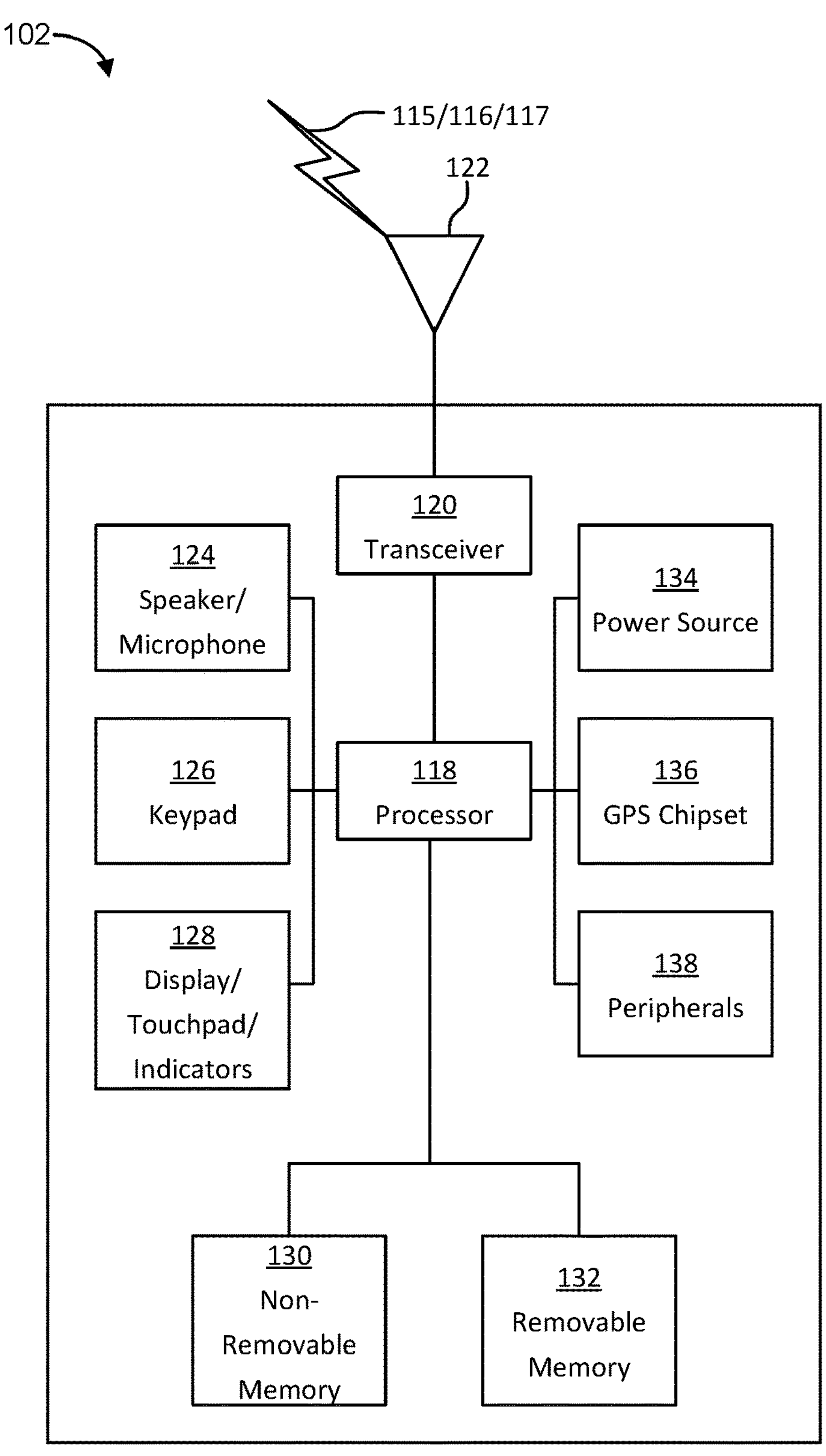
FIG. 16F is a block diagram of an example computing system.

FIG. 16F is a block diagram of an exemplary computing system 90 in which one or more apparatuses of the communications networks illustrated in FIGS. 16A, 16C, 16D and 16E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 16A, 16B, 16C, 16D, and 16E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 16G:
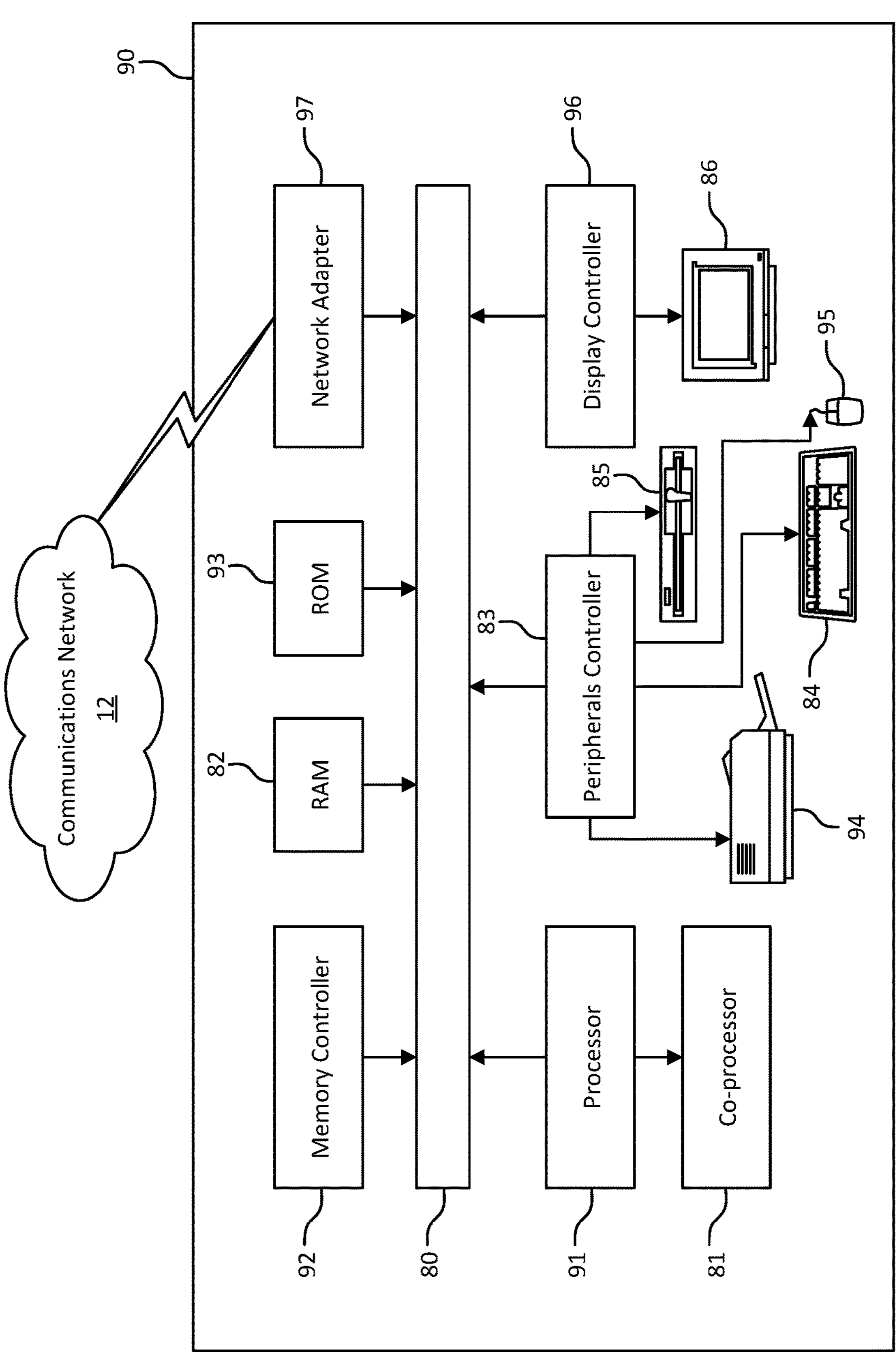
FIG. 16G is a block diagram of another example communications system.

FIG. 16G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC 5 ) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Appendix

TABLE 0

| Abbreviations | |
|---|---|
| ACK-NACK | Acknowledgement - Negative Acknowledgement |
| CA | Carrier Aggregation |
| CAI | Channel Access Indications |
| $CAI_{FBE}$ | Channel Access Indication for FBE operation mode |
| $CAI_{LBE}$ | Channel Access Indication for LBE operation mode |
| CAT2 | Category 2 |
| CAT4 | Category 4 |
| CCA | Clear Channel Assessment |
| CORESET | Control Resource Set |
| COT | Channel Occupancy Time |
| CRC | Cyclic Redundancy Check |
| C-RNTI | Cell Radio-Network Temporary Identifier |
| CSI-RS | Channel State Information Reference Signal |

TABLE 0-continued

| Abbreviations | |
|---|---|
| DCI | DL Control Information |
| DL | Downlink |
| DL-RS | Downlink Reference Signal |
| DMRS | Demodulation Reference Signal |
| eNB | Evolved NodeB |
| FBE | Frame based equipment |
| FFP | Fixed frame period |
| GC-PDCCH | Group Common Physical Downlink Control Channel |
| gNB | Next Generation NodeB |
| IoT | Internet-of-Things |
| LAA | Licensed-Assisted Access |
| LBE | Load based equipment |
| LBT | Listen Before Talk |
| LTE | Long Term Evolution |
| M2M | Machine-To-Machine |
| MAC | Medium Access Control |
| MIB | Master Information Block |
| NACK | Negative Acknowledgement |
| NR | New Radio |
| NR-U | New Radio Unlicensed |
| NZP | Non-Zero Power |
| OFDM | Orthogonal Frequency Division Multiplexing |
| OSI | Other System Information |
| PDCCH | Physical Downlink Control Channel |
| PDSCH | Physical Downlink Shared Channel |
| P-RNTI | Paging-Network Temporary Identifier |
| PSS | Primary synchronization signal |
| PUCCH | Physical uplink control channel |
| PUSCH | Physical uplink shared channel |
| PRACH | Physical Random Access Channel |
| RACH | Random Access Channel |
| RAN | Radio Access Network |
| RLAN | Radio local area network |
| RMSI | Remaining Minimum System Information |
| RNTI | Radio Network Temporary Identifier |
| RRC | Radio Resource Control |
| RSRP | Reference Signal Receive Power |
| RSSI | Received Signal Strength Indicator |
| SB | Sub-Band |
| SCells | Secondary Cells |
| SFN | System Frame Number |
| SINR | Signal to Interference plus Noise Ratio |
| SSB | Synchronization Signal Block |
| SSS | Secondary Synchronization Signal |
| TRP | Transmission and Receive Point |
| UCI | Uplink Control Information |
| UE | User Equipment |
| UL | Uplink |
| V2X | Vehicle Communications |
| WoT | Web-of-Things |
| WUS | Wake-up signal |

TABLE 1

High layer signaling provides multiple configurations for the portion of FBE COT in which COT sharing is allowed

| Index | Duration/index |
|---|---|
| 0 | 7 OFDM symbols |
| 1 | 5 Slots |
| . | . |
| . | . |
| . | . |
| 7 | 5 sub-frames |

TABLE 2

Number of consecutive unsuccessful channel access attempts after which gNB/TRP or UE may switch to LBE

| Channel access priority class | N |
|---|---|
| 1 | 5 |
| 2 | 10 |
| 3 | 15 |
| 4 | 20 |

TABLE 3

Offset values for different channel access priority classes to derive the number of consecutive unsuccessful channel access attempts after which an FBE UE may switch to LBE

| Channel access priority class | Offset value |
|---|---|
| 1 | N |
| 2 | N + 10 |
| 3 | N + 15 |
| 4 | N + 20 |

TABLE 4

Example of the 3 bits indication used to indicate the selected operation mode

| Operation mode indication bits | Operation mode |
|---|---|
| 000 | LBE |
| 001 | FBE-configID = 1 |
| . | . |
| . | . |
| . | . |
| 111 | FBE-configID = 7 |

Code Example 1
LBE_configCommon information element

```
-- ASN1START
-- TAG-DOWNLINKPREEMPTION-START
LBE_configCommon ::=                SEQUENCE {
   CAI-LBE-SearchSpaceId                SearchSpaceId,
   CAI-LBE-ControlResourceSetId             ControlResourceSetId  OPTIONAL,
   FBE_LBE_RNTI                      RNTI-Value,
   ConfigUpdating_SearchSpaceId             SearchSpaceId,
   ConfigUpdating_CoresetID                ControlResourceSetId        OPTIONAL,
}
-- TAG-DOWNLINKPREEMPTION-STOP
```

-continued

Code Example 1
LBE_configCommon information element

```
-- ASN1STOP
```

Code Example 2
FBE_configCommon information element

```
-- ASN1START
-- TAG-DOWNLINKPREEMPTION-START
LBE_configCommon ::=                SEQUENCE {
  FBE-configID                      INTEGER(0..3),
  CAI-FBE-ControlResourceSetId        ControlResourceSetId  OPTIONAL,
  csi-RS-CAI-FBE                      NZP-CSI-RS-ResourceId     OPTIONAL,
  SSB-CAI-FBE                         SSB-Index                 OPTIONAL,
  FFP_duration                      ENUMERATED {ms1, ms4, ms8, ms10}
  FFP_start                         CHOICE {
      sl1                                   NULL,
      sl2                                   INTEGER (0..1),
      sl4                                   INTEGER (0..3),
      sl5                                   INTEGER (0..4),
      sl8                                   INTEGER (0..7),
      sl10                                  INTEGER (0..9),
  }
  FFP_end                           CHOICE {
      sl1                                   NULL,
      sl2                                   INTEGER (0..1),
      sl4                                   INTEGER (0..3),
      sl5                                   INTEGER (0..4),
      sl8                                   INTEGER (0..7),
      sl10                                  INTEGER (0..9),
  }
  COT_duration                      ENUMERATED {ms1, ms4, ms8, ms10}
    idle_window                       ENUMERATED {ms1, ms4, ms8, ms10}
  FBE_LBE_RNTI                      RNTI-Value,
  ConfigUpdating_SearchSpaceId          SearchSpaceId,
  ConfigUpdating_CoresetID              ControlResourceSetId        OPTIONAL,
}
-- TAG-DOWNLINKPREEMPTION-STOP
-- ASN1STOP
```

We claim:

1. A wireless transmit/receive unit (WTRU) comprising a processor configured to:

receive configuration information comprising a frame-based equipment (FBE) configuration or a load based equipment (LBE) configuration;

determine that a timer exceeds a threshold, wherein the timer is associated with a channel;

receive a first indication that the WTRU is to operate in an LBE operating mode;

determine to operate in the LBE operating mode instead of an FBE operating mode based on the first indication and based on the determination that the timer exceeds the threshold;

receive a second indication of a location where a switch between the FBE operating mode and the LBE mode is intended to occur;

switch to the LBE operating mode at the location; and operate in the LBE operating mode in accordance with the received LBE configuration.

2. The WTRU of claim 1, wherein the determination to operate in the LBE operating mode is further based on one or more measurements, wherein the one or more measurements comprise on one or more of: a reference signal received power (RSRP) measurement, a received signal strength indicator (RSSI) measurement, or a signal to interference plus noise ratio (SINR) measurement.

3. The WTRU of claim 1, wherein the processor is further configured to access the channel when operating in the LBE operating mode, and wherein the processor is further configured to send an indication that indicates how the WTRU accesses the channel.

4. The WTRU of claim 1, wherein the processor being configured to operate in the LBE operating mode comprises the processor being configured to access the channel, wherein the channel is in an unlicensed spectrum.

5. The WTRU of claim 1, wherein the processor is further configured to receive the first indication from a base station.

6. The WTRU of claim 1, wherein the determination to operate in the LBE operating mode is based on a counter-based determination, wherein the counter-based determination comprises processor being configured to switch from the FBE operating mode to the LBE operating mode based on a number of unsuccessful attempts to access the channel when operating in the FBE operating mode.

7. The WTRU of claim 6, wherein the number of unsuccessful attempts to access the channel is an average number of failed channel access attempts, and wherein the processor is configured to switch from the FBE operating mode to the LBE operating mode based on the average number of failed channel access attempts.

8. The WTRU of claim 1, wherein:

the configuration information comprises information for a higher priority class and information for a lower priority class, wherein the determination to operate in the LBE operating mode is further based on the information for the higher priority class.

9. The WTRU of claim 1, wherein the configuration information comprises a probability threshold, wherein the probability threshold indicates a probability to access the channel, and wherein the determination to operate in the LBE operating mode is based on the probability threshold.

10. The WTRU of claim 9, wherein the probability threshold is based on the one or more measurements.

11. The WTRU of claim 1, wherein the processor being configured to send the indication to the base station comprises the processor being configured to transmit a piggybacked uplink control information (UCI) that comprises a 1-bit field indicating the determination to operate in the LBE operating mode.

12. A base station comprising a processor configured to:

send, to a wireless transmit/receive unit (WTRU), configuration information comprising a frame-based equipment (FBE) configuration or a load based equipment (LBE) configuration, the FBE configuration comprising a fixed frame period (FFP), an indication of a beginning of an FFP, a time offset, and/or a channel occupancy time (COT) duration;

receive a first indication from the WTRU;

determine, based on the first indication, that the WTRU is to operate selectively in an LBE mode or determine that the WTRU is to operate in a FBE mode; and send a second indication to the WTRU, wherein the second indication indicates that the WTRU is to operate in the FBE mode according to the FBE configuration or wherein the second indication indicates the WTRU is to operate in the LBE mode; and send, to the WTRU, an indication of a location where a switch between the FBE mode and the LBE mode is intended to occur.

13. The base station of claim 12, wherein the processor is further configured to send the FBE configuration via broadcast in a Remaining Minimum System Information (RMSI) block or an Other System Information (OSI) block.

14. The base station of claim 12, wherein the processor is further configured to send the FBE configuration via Radio Resource Control (RRC) signaling.

15. The base station of claim 12, wherein the processor is further configured to send, to the WTRU, a plurality of FBE configurations and a criterion for the WTRU to select the FBE configuration from among the plurality of FBE configurations.

16. The base station of claim 12, wherein the processor is further configured to send, to the WTRU, an indication to switch between the FBE mode and the LBE mode.

* * * * *